US012409664B2

(12) United States Patent
Kyoso

(10) Patent No.: US 12,409,664 B2
(45) Date of Patent: Sep. 9, 2025

(54) LIQUID SUPPLY SYSTEM, LIQUID CIRCULATION METHOD, AND PRINTING SYSTEM

(71) Applicant: FUJIFILM Corporation, Tokyo (JP)

(72) Inventor: Tadashi Kyoso, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 18/324,998

(22) Filed: May 28, 2023

(65) Prior Publication Data

US 2023/0302812 A1 Sep. 28, 2023

Related U.S. Application Data

(63) Continuation of application No. PCT/JP2021/042887, filed on Nov. 24, 2021.

(30) Foreign Application Priority Data

Dec. 2, 2020 (JP) ................................ 2020-200189

(51) Int. Cl.
*B41J 2/175* (2006.01)

(52) U.S. Cl.
CPC ....... *B41J 2/17596* (2013.01); *B41J 2/17566* (2013.01)

(58) Field of Classification Search
CPC .... B41J 2/175; B41J 2/17506; B41J 2/17509; B41J 2/17513; B41J 2/17523; B41J 2/53; B41J 2/17566; B41J 2/17596; B41J 2/18
See application file for complete search history.

(56) References Cited

U.S. PATENT DOCUMENTS 6,692,119 B2 * 2/2004 Yu ........................ B41J 2/17556 347/86
8,366,224 B2 2/2013 Yokota et al.
(Continued)

FOREIGN PATENT DOCUMENTS

JP 2002273867 9/2002
JP 2010083021 4/2010
(Continued)

OTHER PUBLICATIONS

"International Search Report (Form PCT/ISA/210) of PCT/JP2021/042887", mailed on Feb. 15, 2022, with English translation thereof, pp. 1-5.

(Continued)

*Primary Examiner* — Anh T Vo
(74) *Attorney, Agent, or Firm* — JCIPRENT

(57) ABSTRACT

The liquid supply system includes: a buffer tank (12) in which a liquid to be supplied to a liquid supply target device (15) is stored; a liquid level varying device (78, 82) that changes a liquid level height in the buffer tank; a liquid flow passage (16, 18) through which the liquid supply target device and the buffer tank communicate with each other; a pump (98A) provided in the liquid flow passage; and a valve (97A) for opening and closing the liquid flow passage, in which in a case in which the liquid supply target device is not in operation, the liquid is discharged from the buffer tank to lower the liquid level height in the buffer tank; and the pump and the valve are controlled to allow the liquid to flow into the buffer tank from the liquid flow passage.

16 Claims, 21 Drawing Sheets

(56) References Cited

U.S. PATENT DOCUMENTS

| | | | | |
|---|---|---|---|---|
| 9,073,336 | B1 | 7/2015 | Matsumoto et al. | |
| 9,358,794 | B2 | 6/2016 | Matsumoto et al. | |
| 2004/0001177 | A1* | 1/2004 | Byun | G02F 1/1339 349/187 |
| 2016/0001570 | A1 | 1/2016 | Okayama | |
| 2017/0087864 | A1* | 3/2017 | Akishiba | B41J 2/17596 |
| 2017/0297346 | A1* | 10/2017 | Ohtsu | B41J 2/17513 |
| 2020/0230971 | A1 | 7/2020 | Nishizawa et al. | |

FOREIGN PATENT DOCUMENTS

| | | |
|---|---|---|
| JP | 2010099855 | 5/2010 |
| JP | 2010184384 | 8/2010 |
| JP | 2014180829 | 9/2014 |
| JP | 2015071263 | 4/2015 |
| JP | 2015128850 | 7/2015 |
| JP | 2017052099 | 3/2017 |
| JP | 2017119355 | 7/2017 |
| JP | 2020116813 | 8/2020 |
| JP | 2021112825 | 8/2021 |
| WO | 2015029599 | 3/2015 |
| WO | 2020134055 | 7/2020 |

OTHER PUBLICATIONS

"Written Opinion of the International Searching Authority (Form PCT/ISA/237) of PCT/JP2021/042887", mailed on Feb. 15, 2022, with English translation thereof, pp. 1-10.

1 "Search Report of Europe Counterpart Application", issued on May 24, 2024, p. 1-p. 9.

"Notice of Reasons for Refusal of Japan Counterpart Application", issued on May 19, 2025, with English translation thereof, p. 1-p. 9.

* cited by examiner

LIQUID SUPPLY SYSTEM, LIQUID CIRCULATION METHOD, AND PRINTING SYSTEM

CROSS-REFERENCE TO RELATED APPLICATIONS

The present application is a Continuation of PCT International Application No. PCT/JP2021/042887 filed on Nov. 24, 2021 claiming priority under 35 U.S.C § 119(a) to Japanese Patent Application No. 2020-200189 filed on Dec. 2, 2020. Each of the above applications is hereby expressly incorporated by reference, in its entirety, into the present application.

BACKGROUND OF THE INVENTION

1. Field of the Invention

The present invention relates to a liquid supply system, a liquid circulation method, and a printing system.

2. Description of the Related Art

In an ink jet printing device, there is known a configuration in which a buffer tank in which ink is temporarily stored is provided, and ink is supplied from the buffer tank to an ink jet head to cope with fluctuations in ink consumption. The ink jet printing device comprising the buffer tank can circulate the ink between the ink jet head and the buffer tank to allow the ink to flow, thereby stabilizing physical properties of the ink such as a viscosity and a temperature of the ink supplied to the ink jet head.

JP2015-128850A discloses a liquid jetting device that connects a liquid storage portion and a liquid jetting portion via a supply flow passage and a return flow passage. The device disclosed in the same document supplies a liquid from the liquid storage portion to the liquid jetting portion in a supply mode. In addition, the device circulates the liquid between the liquid storage portion and a liquid flow passage in a circulation mode. Specifically, in the circulation mode in the device, the liquid is allowed to flow in the order of the supply flow passage, a liquid storage chamber, the return flow passage, and the liquid storage portion from the liquid storage portion.

JP2017-119355A discloses an ink jet printing device comprising an ink jetting portion that jets white ink. The printer disclosed in the same document comprises an ink supply pipe that supplies ink to an ink jetting portion that jets white ink, and an ink delivery pipe that deliveries the ink from the ink jetting portion to an ink supply portion. The printer circulates the ink between the ink jetting portion and the ink supply portion by using the ink supply pipe and the ink delivery pipe to prevent precipitation of a colorant.

JP2010-083021A discloses an ink jet recording device comprising an ink supply system that circulates ink between a head and a buffer tank. In the device disclosed in the same document, the ink is supplied from the buffer tank to the head via a supply flow passage. In addition, the device executes ink circulation for recovering the ink from the head to the buffer tank via a recovery flow passage.

The buffer tank provided in the device comprises a liquid level sensor. In the device, the ink is supplied from a main tank to the buffer tank in a case in which an amount of ink stored in the buffer tank is equal to or less than a reference value.

JP2010-099855A discloses an ink jet recording device that can cause ink circulation between a buffer tank and an ink tank to effectively stir the ink in the ink tank or the like.

JP2002-273867A discloses an ink jet jetting device comprising a stirring motor and stirring blades as stirring means that stirs an inside of an ink tank. The device disclosed in the same document stirs the ink stored in the ink tank to prevent precipitation of a solid content of the ink such as coloring particles.

JP2015-071263A discloses an ink jet recording device that forms an image using pigment-based ink. The device disclosed in the same document stirs the pigment-based ink stored in an ink container to prevent precipitation of pigment particles on a bottom surface of the ink container.

SUMMARY OF THE INVENTION

However, the ink inside the buffer tank may have a distribution such as a temperature distribution and sedimentation of particles. In a case in which the distribution occurs in the ink inside the ink jet head due to the distribution of the ink inside the buffer tank, there is a concern that a jetting performance of the ink jet head may be affected.

In the invention disclosed in JP2015-128850A, generation of ink distribution in the supply flow passage and a circulation flow passage can be suppressed due to the execution of the circulation mode, but it is difficult to suppress the ink distribution in the liquid storage portion corresponding to the buffer tank. Similar problems may occur in the invention disclosed in JP2017-119355A, the invention disclosed in JP2010-083021A, and the invention disclosed in JP2010-099855A.

In the invention disclosed in JP2002-273867A, generation of the ink distribution inside the ink tank can be suppressed by rotating the stirring blades inside the ink tank, but the provision of the stirring blades and the stirring motor leads to an increase in cost of the device. In addition, in such a configuration, a device configuration and control are complicated, and a failure of the device is likely to occur.

Further, in a case in which the stirring blades are rotated to stir the ink inside the ink tank, the ink around the stirring blades is stirred, but it is difficult to stir the ink in a region separated from the stirring blades by a certain distance. Although the ink in the ink tank can be stirred using a stirrer, a stirring bar, or the like instead of the stirring blades, there is a concern that the stirring bar is worn due to friction between the stirring bar or the like and an inner wall of the ink tank. Similar problems may occur in the invention disclosed in JP2015-071263A.

The problem of the generation of distribution in the ink contained in the buffer tank is not inherent to the ink jet printing device, and a similar problem may occur in a liquid supply device that supplies a liquid to a liquid supply target device that performs processing using a liquid.

The present invention has been made in view of such circumstances, and an object of the present invention is to provide a liquid supply system, a liquid circulation method, and a printing system with which generation of distribution of a liquid stored in a buffer tank can be suppressed.

A liquid supply system according to the present disclosure comprises: a buffer tank in which a liquid to be supplied to a liquid supply target device is stored and that is provided with a liquid inlet and outlet through which the liquid enters and exits; a liquid level varying device that changes a liquid level height in the buffer tank; a liquid flow passage through which the liquid supply target device and the buffer tank communicate with each other; a pump provided in the liquid flow passage; a valve for opening and closing the liquid flow passage; and one or more processors, in which the processor is configured to: in a case in which the liquid supply target device is not in operation, control the liquid level varying device such that the liquid is discharged from the buffer tank to lower the liquid level height in the buffer tank with respect to the liquid level height in the buffer tank in a case in which the liquid supply target device is in operation; and in a case in which the liquid supply target device is not in operation, control the pump and the valve to allow the liquid to flow into the buffer tank from the liquid flow passage.

According to the liquid supply device according to the present disclosure, in liquid circulation executed in a case in which the liquid supply target device is not in operation, the liquid level height in the buffer tank is lowered with respect to the liquid level height in the buffer tank in a case in which the liquid supply target device is in operation. As a result, a cross-sectional area through which the liquid flows in the buffer tank is relatively reduced, a flow velocity of the liquid in the buffer tank is relatively increased, and stirring of the liquid in the buffer tank is promoted, whereby generation of distribution of the liquid stored in the buffer tank can be suppressed.

The liquid supply target device is a device that uses the liquid supplied from the liquid supply device. Examples of the liquid supply target device include a printing device, a printing head, and a coating device.

The liquid level varying device may include a discharge flow passage connected to a sub-tank, a valve provided in the discharge flow passage, a pump provided in the discharge flow passage, and the like, as components. The valve and the pump may be controlled based on a control signal transmitted from the processor.

A position of the liquid level in a case in which the liquid level height is lowered is preferably a position above an upper end position of the liquid inlet and outlet.

The liquid flow passage through which the liquid supply target device and the buffer tank communicate with each other may include a plurality of flow passages. The liquid flow passage may be provided with a liquid reservoir in which the liquid is temporarily stored, a damper that suppresses the pulsation of the liquid, and the like.

The processor may operate the pump to supply the liquid from the buffer tank to the liquid supply target device via the liquid flow passage, reversely operate the pump with respect to a case of supplying the liquid to allow the liquid to flow backward, and allow the liquid to flow into the buffer tank from the liquid supply target device by using the same liquid flow passage.

In the liquid supply system according to another aspect, as the liquid, a liquid in which particles capable of being sedimented in a solvent are dispersed in the solvent is applied.

According to such an aspect, sedimentation of the particles in an inside of the buffer tank can be suppressed.

Examples of the particles include coloring material particles such as titanium oxide particles contained in white ink and resin particles contained in a coating liquid.

In the liquid supply system according to another aspect, in the liquid, a density of the particles is 2.0 grams per cubic centimeter or greater.

The density of the particles in such an aspect may be 5.0 grams per cubic centimeter or less.

In the liquid supply system according to another aspect, the buffer tank includes a supply port and a recovery port as the liquid inlet and outlet, the liquid flow passage includes a supply flow passage communicating with the supply port, and a recovery flow passage communicating with the recovery port and the supply flow passage, and the pump includes a supply pump provided in the supply flow passage, and a recovery pump provided in the recovery flow passage.

According to such an aspect, circulation of the liquid can be executed in which the liquid is supplied from the buffer tank to the liquid supply target device via the supply flow passage, and the liquid is recovered from the liquid supply target device to the buffer tank via the recovery flow passage.

The supply flow passage and the recovery flow passage may communicate with each other via a flow passage structure such as a liquid reservoir, or may communicate with each other via another flow passage.

In the liquid supply system according to another aspect, the processor is configured to control any one of the supply pump or the recovery pump to execute reverse circulation in which the liquid flows in a direction different from normal circulation in which the liquid flows out via the supply port and the liquid flows into the buffer tank via the liquid inlet and outlet different from the supply port.

According to such an aspect, the reverse circulation is executed to allow the liquid to flow into the buffer tank via the supply port. As a result, in the inside of the buffer tank, a liquid flow different from that in the case in which the normal circulation is executed may be generated to disperse sedimenting particles, such as particles precipitating on a bottom surface of the buffer tank.

In the liquid supply system according to another aspect, the liquid flow passage includes a bypass flow passage that communicates with the buffer tank and the supply flow passage and is a separate flow passage from the recovery flow passage, the buffer tank includes a bypass port communicating with the bypass flow passage, as the liquid inlet and outlet, and the processor is configured to execute the reverse circulation in which the supply pump is reversely operated with respect to the normal circulation, and the liquid flows in the bypass flow passage and the supply flow passage in a direction different from the normal circulation.

According to such an aspect, the liquid is allowed to flow into the buffer tank via the bypass port. As a result, in the inside of the buffer tank, a liquid flow different from that in the case in which the normal circulation is executed may be generated to disperse sedimenting particles, such as particles precipitating on a bottom surface of the buffer tank.

In such an aspect, the normal circulation can be executed in which the liquid is supplied from the buffer tank to the liquid supply target device via the supply flow passage, and the liquid is returned from the liquid supply target device via the bypass flow passage.

In the liquid supply system according to another aspect, the liquid supply system further comprises: a filter provided in the supply flow passage, in which the processor is configured to control any one of the supply pump or the recovery pump to execute the normal circulation in which the liquid that has not passed through the filter returns to the buffer tank, after the reverse circulation is executed.

According to such an aspect, in a case in which the liquid is supplied to the liquid supply target device after the reverse circulation is executed, the supply of the liquid that has not passed through the filter to the liquid supply target device is suppressed.

In the liquid supply system according to another aspect, the liquid level varying device includes the supply flow passage and the supply pump, and the processor is configured to control the supply pump to feed the liquid from the buffer tank to the liquid supply target device via the supply port and the supply flow passage.

According to such an aspect, in a case of lowering the liquid level height in the buffer tank, the liquid can be discharged from the buffer tank via the supply flow passage and the liquid supply target device.

In the liquid supply system according to another aspect, the liquid level varying device includes a replenishment flow passage communicating with the liquid inlet and outlet, a replenishment pump provided in the replenishment flow passage, and a main tank communicating with the replenishment flow passage, and the processor is configured to control the replenishment pump to feed the liquid from the buffer tank to the main tank via the liquid inlet and outlet and the replenishment flow passage.

According to such an aspect, in a case of lowering the liquid level height in the buffer tank, the liquid can be discharged from the buffer tank to the main tank via the replenishment flow passage.

In the liquid supply system according to another aspect, the processor is configured to control the pump to increase a flow rate of the liquid with respect to a flow rate of the liquid in a case in which the liquid supply target device is in operation, in a range where a performance of the pump is acceptable.

According to such an aspect, the liquid flow in the buffer tank can be made relatively fast in the range where the performance of the pump is acceptable.

As the range where the performance of the pump is acceptable, a range set as an operating condition of the pump in a case of operating the liquid supply target device can be applied.

In the liquid supply system according to another aspect, the processor is configured to set non-supply of the liquid to the liquid supply target device in a case in which liquid circulation is executed in a case in which the liquid supply target device is not in operation.

According to such an aspect, occurrence of an abnormality such as a liquid leak in the liquid supply target device can be suppressed.

In the liquid supply system according to another aspect, the buffer tank includes a bottom surface having a structure in which stagnation of a liquid flow is suppressed.

According to such an aspect, the stagnation of the liquid on the bottom surface of the buffer tank is suppressed.

In such an aspect, the structure in which the stagnation of the liquid flow is suppressed may also be applied to a side surface of the buffer tank.

In the liquid supply system according to another aspect, the buffer tank includes a bottom surface that is subjected to a coating treatment in which a fluorine resin is applied as a coating material.

According to such an aspect, the liquid flow on the bottom surface of the buffer tank is promoted.

In such an aspect, a fluorine resin coating treatment may also be applied to the side surface of the buffer tank.

In the liquid supply system according to another aspect, the buffer tank is configured such that a distance from a side surface intersecting a surface on which the liquid inlet and outlet is disposed to a center of the liquid inlet and outlet is equal to or more than half of an inner diameter of the liquid inlet and outlet, and is equal to or less than three times the inner diameter of the liquid inlet and outlet.

According to such an aspect, the liquid inlet and outlet is disposed in the vicinity of the side surface of the buffer tank. As a result, the stagnation of the liquid at an edge of the buffer tank is suppressed.

In an aspect in which a plurality of the liquid inlets and outlets are provided, it is preferable to dispose the liquid inlet and outlet through which the liquid flows into the buffer tank during the normal circulation in the vicinity of the side surface of the buffer tank.

A liquid circulation method according to the present disclosure is a liquid circulation method that is applied to a liquid supply device that supplies a liquid from a buffer tank to a liquid supply target device through a liquid flow passage, the method comprising: discharging the liquid from the buffer tank to lower a liquid level height in the buffer tank with respect to a liquid level height in the buffer tank in a case in which the liquid supply target device is in operation, in a case in which the liquid supply target device is not in operation; and controlling a pump and a valve provided in the liquid flow passage to allow the liquid to flow into the buffer tank from the liquid flow passage, in a case in which the liquid supply target device is not in operation.

According to the liquid circulation method according to the present disclosure, it is possible to obtain the same functions and effects as those of the liquid supply system according to the present disclosure. Configuration requirements of the liquid supply system according to another aspect can be applied to configuration requirements of the liquid circulation method according to another aspect.

A printing system according to the present disclosure is a printing system comprising: a buffer tank in which ink to be supplied to a printing head is stored and that is provided with a liquid inlet and outlet through which the ink enters and exits; a liquid level varying device that changes a liquid level height in the buffer tank; a liquid flow passage through which the printing head and the buffer tank communicate with each other; a pump provided in the liquid flow passage; a valve for opening and closing the liquid flow passage; and one or more processors, in which the processor is configured to: in a case in which the printing head is not in operation, control the liquid level varying device such that the ink is discharged from the buffer tank to lower the liquid level height in the buffer tank with respect to the liquid level height in the buffer tank in a case in which the printing head is in operation; and in a case in which the printing head is not in operation, control the pump and the valve to allow the ink to flow into the buffer tank from the liquid flow passage.

According to the printing system according to the present disclosure, it is possible to obtain the same functions and effects as those of the liquid supply system according to the present disclosure. Configuration requirements of the liquid supply system according to another aspect can be applied to configuration requirements of the printing system according to another aspect.

According to the present disclosure, in liquid circulation executed in a case in which the liquid supply target device is not in operation, the liquid level height in the buffer tank is lowered with respect to the liquid level height in the buffer tank in a case in which the liquid supply target device is in operation. As a result, a cross-sectional area through which the liquid flows in the buffer tank is relatively reduced, a flow velocity of the liquid in the buffer tank is relatively increased, and stirring of the liquid in the buffer tank is promoted, whereby generation of distribution of the liquid stored in the buffer tank can be suppressed.

DESCRIPTION OF THE PREFERRED EMBODIMENTS

Figure 1:
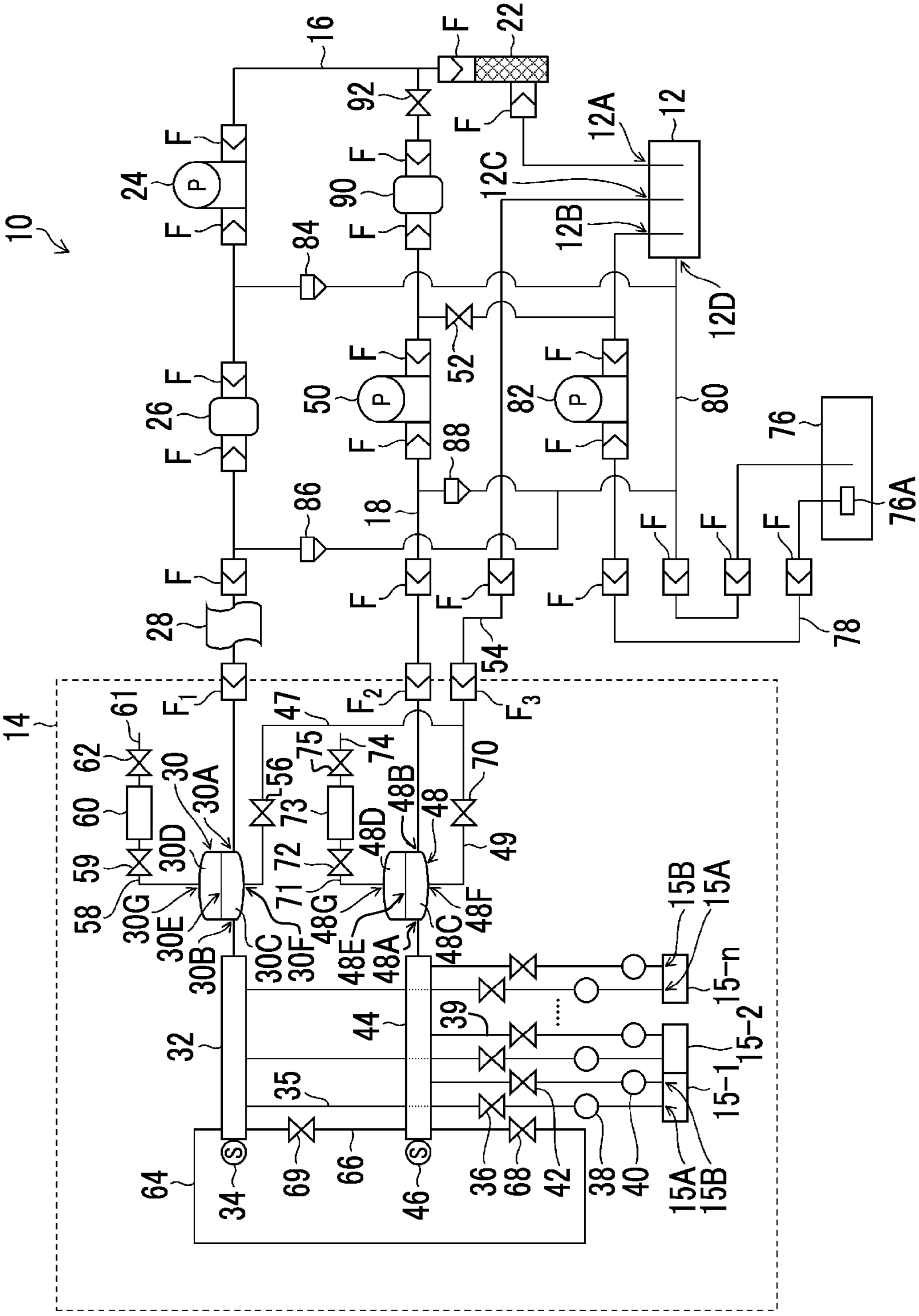
FIG. 1 is an overall configuration diagram of an ink supply device according to an embodiment.

Hereinafter, preferred embodiments of the present invention will be described with reference to the accompanying drawings. In the present specification, the same components are denoted by the same reference numerals, and duplicate description thereof will be omitted as appropriate.

[Overall Configuration of Ink Supply Device]

FIG. 1 is an overall configuration diagram of an ink supply device according to an embodiment. An ink supply device 10 is a device that supplies ink to an ink jet bar 14, and comprises a buffer tank 12, a supply flow passage 16, and a recovery flow passage 18.

In the buffer tank 12, ink to be supplied to the ink jet bar 14 is temporarily stored. The ink supply device 10 stably supplies ink from the buffer tank 12 to the ink jet bar 14 in accordance with the ink consumption of the ink jet bar 14.

The buffer tank 12 comprises a supply port 12A, a recovery port 12B, a bypass port 12C, and an overflow port 12D. The supply port 12A is connected to the supply flow passage 16 via a joint. The recovery port 12B is connected to the recovery flow passage 18 via a joint. The bypass port 12C is connected to a replenishment flow passage 78 via a joint. The overflow port 12D is connected to an overflow passage 80 via a joint. In FIG. 1, a joint that connects the buffer tank 12 and each flow passage is not shown.

The buffer tank 12 and the ink jet bar 14 communicate with each other through the supply flow passage 16 via a joint $F_1$. The ink jet bar 14 and the buffer tank 12 communicate with each other through the recovery flow passage 18 via a joint $F_2$. The ink stored in the buffer tank 12 is supplied to the ink jet bar 14 via the supply flow passage 16. In addition, the ink that is not used in the ink jet bar 14 is recovered to the buffer tank 12 via the recovery flow passage 18.

The supply flow passage 16 and the recovery flow passage 18 are configured to include a flow passage constituent member such as a tube. A flow passage control device, such as a pump or a valve, is connected to the supply flow passage 16 and the recovery flow passage 18 by using a joint F.

A deaeration module 22, a supply pump 24, a supply-side filter 26, and a heat exchanger 28 are connected to the supply flow passage 16 as a flow passage control device.

The deaeration module 22 performs a deaeration treatment on the ink passing through the supply flow passage 16. The supply pump 24 applies pressure to the ink inside the supply flow passage 16 to cause the ink inside the supply flow passage 16 to generate a flow. As the supply pump 24, a tube pump can be applied. The supply-side filter 26 removes air bubbles, foreign matter, and the like contained in the ink. The heat exchanger 28 adjusts a temperature of the ink.

A recovery pump 50 and a recovery flow passage valve 52 are connected to the recovery flow passage 18 as a flow passage control device. The recovery pump 50 applies pressure to the ink inside the recovery flow passage 18 to cause the ink inside the recovery flow passage 18 to generate a flow. As the recovery pump 50, a tube pump can be applied. The recovery flow passage valve 52 operates in response to a control signal to switch between opening and closing of the recovery flow passage 18 between the recovery pump 50 and the buffer tank 12.

The ink supply device 10 comprises an ink main tank 76, a replenishment flow passage 78, an overflow passage 80, and a replenishment pump 82. The replenishment flow passage 78 and the overflow passage 80 are provided with a joint F.

The ink main tank 76 stores the ink to be supplied to the buffer tank 12. The ink main tank 76 and the recovery port 12B of the buffer tank 12 communicate with each other through the replenishment flow passage 78 via a joint F. The ink main tank 76 and the overflow port 12D of the buffer tank 12 communicate with each other through the overflow passage 80 via a joint F.

The replenishment pump 82 applies pressure to the ink inside the replenishment flow passage 78 to cause the ink inside the replenishment flow passage 78 to generate a flow. As the replenishment pump 82, a tube pump can be applied.

In accordance with the driving of the replenishment pump 82, the ink is replenished from the ink main tank 76 to the buffer tank 12.

A main tank filter 76A is provided at an end of the replenishment flow passage 78 on the side of the ink main tank 76. The main tank filter 76A removes foreign matter and the like from the ink replenished from the ink main tank 76 to the buffer tank 12.

In a case in which the buffer tank 12 is replenished with the ink in excess of a predetermined amount of the buffer tank 12, the ink is returned from the buffer tank 12 to the ink main tank 76 via the overflow port 12D and the overflow passage 80.

The ink supply device 10 comprises a first safety valve 84, a second safety valve 86, a third safety valve 88, a recovery-side filter 90, and a recovery-side filter valve 92.

In the ink supply device 10, in a case in which internal pressure of the supply flow passage 16 rises above a predetermined value, the first safety valve 84 and the second safety valve 86 operate to reduce the internal pressure of the supply flow passage 16. In addition, in the ink supply device 10, in a case in which internal pressure of the recovery flow passage 18 rises above a predetermined value, the third safety valve 88 operates to reduce the internal pressure of the recovery flow passage 18.

The recovery-side filter valve 92 operates in response to a control signal to switch between opening and closing between the recovery pump 50 and the deaeration module 22. The ink supply device 10 maintains the recovery-side filter valve 92 in an opened state, and allows the ink that has passed through the deaeration module 22 to pass through the recovery-side filter 90.

The ink supply device 10 comprises a bypass flow passage 54. A joint $F_3$ of the ink jet bar 14 and the bypass port 12C of the buffer tank 12 communicate with each other through the bypass flow passage 54. The bypass flow passage 54 is a flow passage through which the ink is fed from the ink jet bar 14 to the buffer tank 12 without passing through the recovery flow passage 18. The bypass flow passage 54 is provided with a joint F.

The ink supply device 10 described in the embodiment is an example of a liquid supply system. Each of the supply port 12A, the recovery port 12B, and the bypass port 12C described in the embodiment is an example of a liquid inlet and outlet through which a liquid enters and exits. The ink described in the embodiment is an example of a liquid.

The replenishment flow passage 78 and the replenishment pump 82 according to the embodiment are examples of components of a liquid level varying device. The supply flow passage 16 and the supply pump 24 described in the embodiment are examples of components of the liquid level varying device.

The supply flow passage 16, the recovery flow passage 18, and the bypass flow passage 54 described in the embodiment are examples of a liquid flow passage. A supply-side back pressure tank 30, a supply-side head manifold 32, a recovery damper 40, a recovery valve 42, a drain flow passage 47, a drain flow passage 49, a first bypass flow passage 64, and a second bypass flow passage 66 described in the embodiment are examples of a liquid flow passage.

[Example of Flow Passage Structure of Ink Jet Bar]

The ink jet bar 14 shown in FIG. 1 is a line-type ink jet head that comprises a plurality of head modules 15 and has a structure in which the plurality of head modules 15 are joined together. FIG. 1 illustrates the ink jet bar 14 comprising n pieces of the head modules 15. FIG. 1 illustrates three head modules denoted by reference numerals 15-1, 15-2, and **15-*n* among the n pieces of the head modules. The same applies to FIG. 4** and the like.

The ink jet bar 14 is not limited to the aspect in which the plurality of head modules 15 are provided, and may adopt an aspect in which one head module 15 is provided. That is, n representing the number of the head modules 15 may be an integer of one or more.

The ink jet bar 14 comprises the supply-side back pressure tank 30. The supply-side back pressure tank 30 is a pressure buffering device that suppresses fluctuations in the internal pressure of the supply flow passage 16. The supply-side back pressure tank 30 communicates with the supply flow passage 16 via an ink inlet 30A and the joint $F_1$.

The supply-side back pressure tank 30 comprises an ink outlet 30B, a liquid chamber 30C, an air chamber 30D, an elastic film 30E, an air bubble discharge port 30F, and an air flow passage communication port 30G. The ink that has flowed in from the ink inlet 30A flows out from the ink outlet 30B via the liquid chamber 30C.

The elastic film 30E is disposed between the liquid chamber 30C and the air chamber 30D, and separates the liquid chamber 30C and the air chamber 30D. The elastic film 30E is deformed according to the pressure fluctuation of the ink passing through the liquid chamber 30C to reduce the pressure fluctuation of the ink passing through the liquid chamber 30C.

The air chamber 30D communicates with an air flow passage 58 via the air flow passage communication port 30G. The air chamber 30D and an air tank 60 communicate with each other through the air flow passage 58 via an air connect valve 59. The air tank 60 communicates with an atmospheric communication path 61. The atmospheric communication path 61 is provided with an air valve 62.

The air bubble discharge port 30F of the liquid chamber 30C communicates with the bypass flow passage 54 via the drain flow passage 47 and the joint $F_3$. The drain flow passage 47 is provided with a drain valve 56. The drain valve 56 operates in response to a control signal to switch between opening and closing of the drain flow passage 47.

The ink jet bar 14 comprises the supply-side head manifold 32. The supply-side head manifold 32 communicates with the ink outlet 30B via the flow passage. The ink discharged from the supply-side back pressure tank 30 flows into the supply-side head manifold 32.

The supply-side head manifold 32 comprises a supply-side pressure sensor 34. The supply-side pressure sensor 34 detects internal pressure of the supply-side head manifold 32. The supply-side head manifold 32 is subjected to pressure control according to a detection result of the supply-side pressure sensor 34.

As the supply-side pressure sensor 34, a sensor of a semiconductor piezo resistance type, a capacitance type, a silicon resonant type, or the like can be applied. The same applies to a recovery-side pressure sensor 46.

The ink jet bar 14 comprises ink supply flow passages 35 as many as the number of the head modules 15. The supply-side head manifold 32 communicates with the head module 15 via the ink supply flow passage 35, and supplies the ink to the head module 15 via an ink supply port 15A via the ink supply flow passage 35.

Each of the ink supply flow passages 35 is provided with a supply valve 36 and a supply damper 38. In FIG. 1, only one of n pieces of the ink supply flow passages 35 is denoted by a reference numeral. The same applies to n pieces of the supply valves 36 and n pieces of the supply dampers 38.

The ink jet bar 14 comprises ink recovery flow passages 39 as many as the number of the head modules 15. The ink recovery flow passage 39 is connected to each of the head modules 15.

The ink jet bar 14 comprises a recovery-side head manifold 44. Each of the head modules 15 communicates with the recovery-side head manifold 44 via the ink recovery flow passage 39, and discharges the ink from an ink discharge port 15B to the recovery-side head manifold 44 via the ink recovery flow passage 39.

The recovery-side head manifold 44 comprises the recovery-side pressure sensor 46. The recovery-side pressure sensor 46 detects internal pressure of the recovery-side head manifold 44. The recovery-side head manifold 44 is subjected to pressure control according to a detection result of the recovery-side pressure sensor 46.

Each of the ink recovery flow passages 39 is provided with the recovery damper 40 and the recovery valve 42. In FIG. 1, only one of n pieces of the recovery dampers 40 is denoted by a reference numeral. The same applies to n pieces of the recovery valves 42.

The ink jet bar 14 comprises a recovery-side back pressure tank 48. The recovery-side back pressure tank 48 is a pressure buffering device that suppresses fluctuations in internal pressure of a flow passage between the recovery-side head manifold 44 and the joint $F_3$.

An ink inlet 48A of the recovery-side back pressure tank 48 communicates with the recovery-side head manifold 44 via a flow passage. The recovery-side back pressure tank 48 comprises an ink outlet 48B. The recovery-side back pressure tank 48 communicates with the recovery flow passage 18 via the ink outlet 48B and the joint $F_2$.

The recovery-side back pressure tank 48 comprises a liquid chamber 48C, an air chamber 48D, an elastic film 48E, and an air flow passage communication port 48G. Each of the liquid chamber 48C, the air chamber 48D, and the elastic film 48E has the same structure and function as the liquid chamber 30C, the air chamber 30D, and the elastic film 30E provided in the supply-side back pressure tank 30.

The air chamber 48D communicates with the air flow passage 71 via the air flow passage communication port 48G. The air flow passage 71 communicates the air chamber 48D and the air tank 73 via the air connect valve 72, and the air tank 73 communicates with the atmospheric communication path 74. The atmospheric communication path 74 is provided with an air valve 75.

An air bubble discharge port 48F of the liquid chamber 48C is connected to the bypass flow passage 54 via the drain flow passage 49 and the joint $F_3$. The drain flow passage 49 is provided with a drain valve 70. The drain valve 70 operates in response to a control signal to switch between opening and closing of the drain flow passage 49.

The ink jet bar 14 comprises a first bypass flow passage 64 and a second bypass flow passage 66. The supply-side head manifold 32 and the recovery-side head manifold 44 communicate with each other through the first bypass flow passage 64 and the second bypass flow passage 66.

The first bypass flow passage 64 is provided with a first bypass flow passage valve 68. The first bypass flow passage valve 68 operates in response to a control signal to switch between opening and closing of the first bypass flow passage 64. The second bypass flow passage 66 is provided with a second bypass flow passage valve 69. The second bypass flow passage valve 69 switches between opening and closing of the second bypass flow passage 66 in response to a control signal.

Although FIG. 1 illustrates the ink jet bar 14 comprising the plurality of head modules 15, the ink jet bar 14 need only comprise one or more head modules 15. In addition, among the components of the ink jet bar 14 shown in FIG. 1, components other than the head module 15, such as the supply-side back pressure tank 30 and the supply-side head manifold 32, may be components of the ink supply device 10. In such an aspect, an arrangement of the joint $F_1$ or the like that connects the ink supply device 10 and the ink jet bar 14 is changed as appropriate.

FIG. 1 illustrates the ink supply device 10 that supplies one color of ink to one ink jet bar 14. A printing system comprising a plurality of ink jet bars 14 respectively corresponding to a plurality of colors of ink comprises the ink supply device 10 for the number of colors.

In the present embodiment, the aspect in which the ink is supplied from the ink supply device 10 to the ink jet bar 14 has been illustrated, but the ink supply device 10 may adopt an aspect in which a liquid other than the ink is supplied to an liquid supply target device.

[Electric Configuration of Ink Supply Device]

Figure 2:
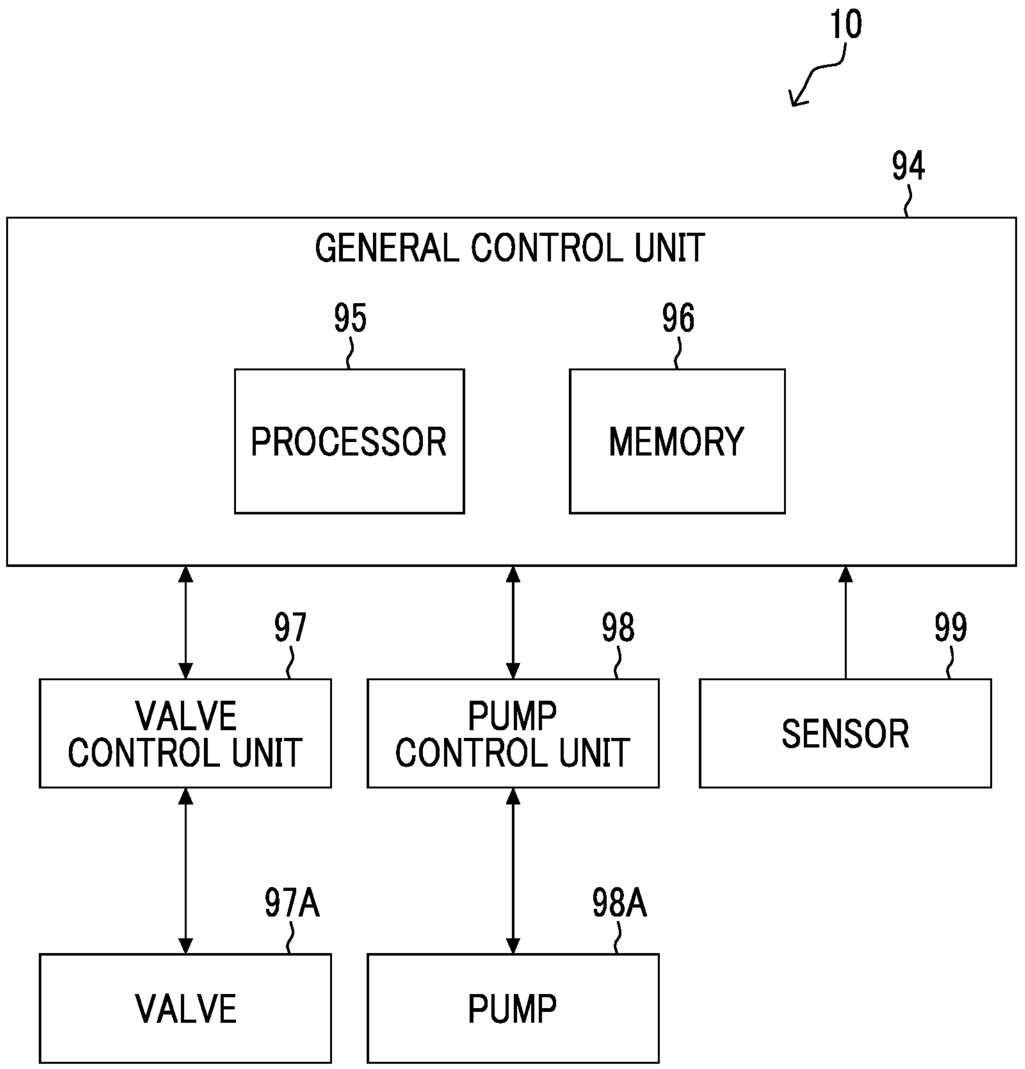
FIG. 2 is a functional block diagram showing an electric configuration of the ink supply device shown in FIG. 1.

FIG. 2 is a functional block diagram showing an electric configuration of the ink supply device shown in FIG. 1. The ink supply device 10 comprises a general control unit 94, a valve control unit 97, and a pump control unit 98.

The general control unit 94 transmits a command signal to the valve control unit 97 and the pump control unit 98 to integrally control an operation of the ink supply device 10. The general control unit 94 comprises one or more processors 95 and one or more memories 96.

The processor 95 executes a program stored in the memory 96. Examples of a hardware structure of the processor 95 include a central processing unit (CPU), a graphics processing unit (GPU), a programmable logic device (PLD), and an application specific integrated circuit (ASIC).

The CPU is a general-purpose processor that executes a program and acts as various functional units. The GPU is a processor specialized in image processing. The term "program" is synonymous with the term "software".

The PLD is a processor capable of changing a configuration of an electric circuit after manufacturing a device. An example of the PLD is a field programmable gate array (FPGA).

The ASIC is a processor comprising a dedicated electric circuit specifically designed to execute a specific process.

One processing unit may be configured of one of these various processors or may be configured of two or more processors of the same type or different types. Examples of a combination of various processors include a combination of one or more FPGAs and one or more CPUs, and a combination of one or more FPGAs and one or more GPUs. Another example of a combination of various processors includes a combination of one or more CPUs and one or more GPUs.

A plurality of functional units may be configured by using one processor. As an example of configuring a plurality of functional units by using one processor, there is an aspect in which, as typified by a computer such as a client or a server, one processor is configured by a combination of one or more CPUs and software such as a system on chip (SoC), and the processor is caused to act as a plurality of functional units.

As another example of configuring a plurality of functional units by using one processor, there is an aspect in which a processor that realizes functions of an entire system including a plurality of functional units by using one IC chip is used. Note that IC is an abbreviation for integrated circuit.

As described above, the various functional units are configured by using one or more of the above described various processors as a hardware structure. Furthermore, the hardware structure of the above described various processors is, more specifically, an electric circuit (circuitry) in which circuit elements such as semiconductor elements are combined.

The memory 96 stores a program executed by the processor 95. The memory 96 stores control parameters used by the processor in executing a program. The memory 96 may comprise one or more random access memories (RAMs) and one or more read only memories (ROMs).

The processor 95 uses the RAM as a work region, executes a control program applied to the ink supply device 10 by using various parameters stored in the ROM, and executes various processes of the ink supply device 10.

The memory 96 can store various types of data applied to the ink supply device 10. The various types of data applied to the ink supply device 10 can be acquired from an external device of the ink supply device 10. Examples of the external device include a server device and a storage device that are connected to the ink supply device 10 via a network to enable data communication.

The valve control unit 97 controls an operation of a valve 97A in response to a command signal transmitted from the general control unit 94. The valve 97A shown in FIG. 2 includes the recovery flow passage valve 52, the recovery-side filter valve 92, and the like shown in FIG. 1. The valve 97A shown in FIG. 2 may include various valves such as the supply valve 36 provided in the ink jet bar 14 shown in FIG. 1.

That is, the valve control unit 97 switches between opening and closing of various valves provided in a flow passage through which the ink returning from the buffer tank 12 to the buffer tank 12 via the ink jet bar 14 passes, and defines the flow passage through which the ink passes.

The pump control unit 98 controls an operation of a pump 98A in response to a command signal transmitted from the general control unit 94. The pump 98A shown in FIG. 2 includes various pumps provided in the ink supply device 10, such as the supply pump 24 shown in FIG. 1.

That is, the pump control unit 98 controls the operation of various pumps provided in the flow passage through which the ink returning from the buffer tank 12 to the buffer tank 12 via the ink jet bar 14 passes, and defines a flow velocity of the ink and a flow direction of the ink.

The valve control unit 97 can apply one or more processors. The pump control unit 98 can apply one or more processors. The valve control unit 97 and the pump control unit 98 may be configured using one or more processors.

The general control unit 94 acquires a detection signal transmitted from a sensor 99. The general control unit 94 controls each part of the ink supply device 10 based on the acquired detection signal. The sensor 99 includes the supply-side pressure sensor 34 and the recovery-side pressure sensor 46 shown in FIG. 1.

The sensor 99 includes a liquid level detection sensor that detects a liquid level height in the buffer tank 12. The general control unit 94 adjusts a liquid level height of the ink stored in the buffer tank 12 based on a detection result of the liquid level height. The liquid level detection sensor is illustrated in FIG. 3 using reference numeral 99A.

[Configuration Example of Buffer Tank]

Figure 3:
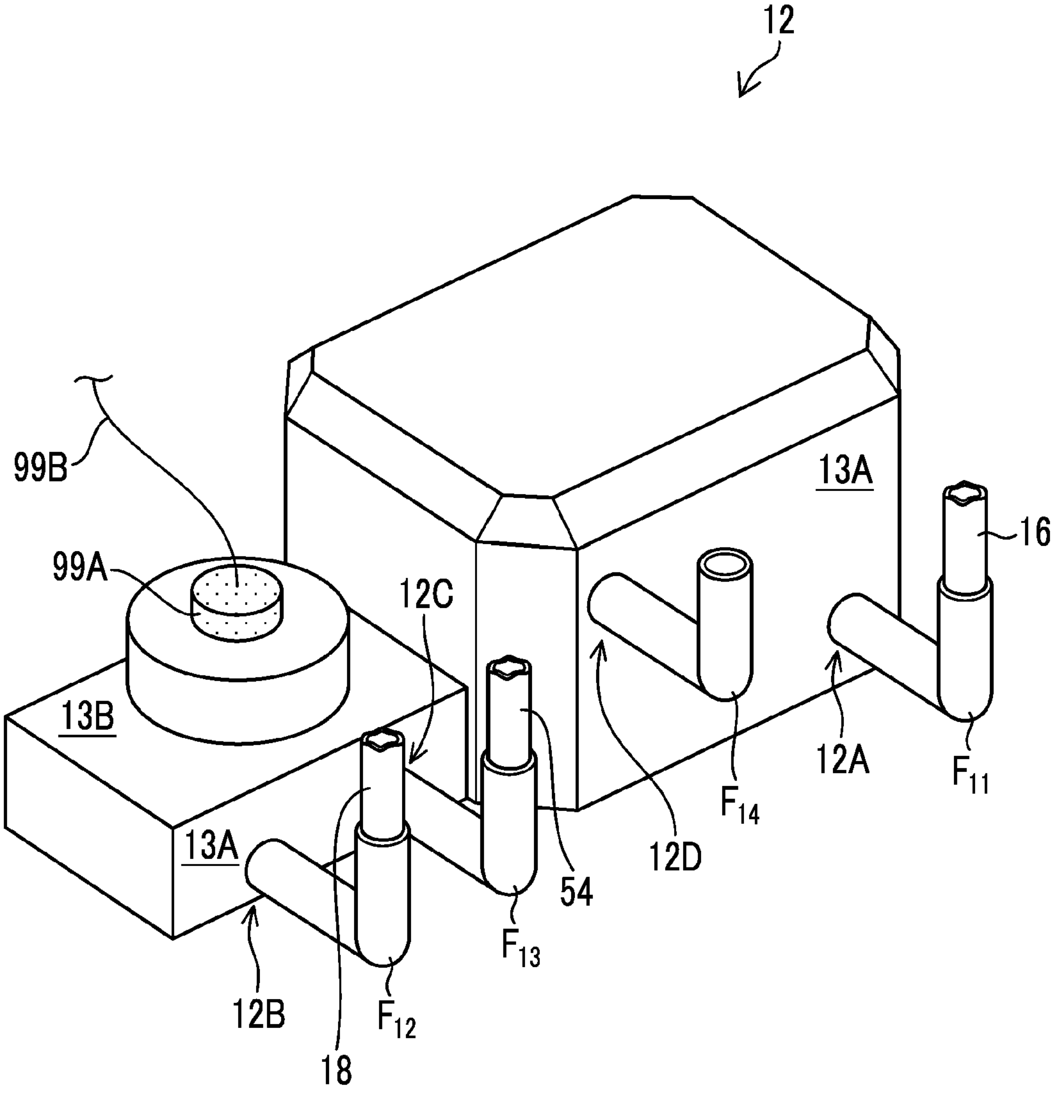
FIG. 3 is a perspective view of a buffer tank shown in FIG. 1.

FIG. 3 is a perspective view of the buffer tank shown in FIG. 1. The supply port 12A, the recovery port 12B, the bypass port 12C, and the overflow port 12D are formed on a side surface 13A of the buffer tank 12. The supply flow passage 16 is connected to the supply port 12A via a joint $F_{11}$. The recovery flow passage 18 is connected to the recovery port 12B via a joint $F_{12}$. The bypass flow passage 54 is connected to the bypass port 12C via a joint $F_{13}$. A joint $F_{14}$ is connected to the overflow port 12D.

The liquid level detection sensor 99A is attached to an upper surface 13B of the buffer tank 12. A wiring line 99B for transmitting a detection signal output from the liquid level detection sensor 99A is attached to the liquid level detection sensor 99A. The liquid level detection sensor 99A detects the liquid level height of the ink in the buffer tank 12.

The general control unit 94 controls the operation of the pump 98A such as the replenishment pump 82 via the pump control unit 98 based on the detection signal transmitted from the liquid level detection sensor 99A, and adjusts the amount of the ink stored in the buffer tank 12.

[Ink Circulation in Non-Printing Period]

[Normal Circulation]

Figure 4:
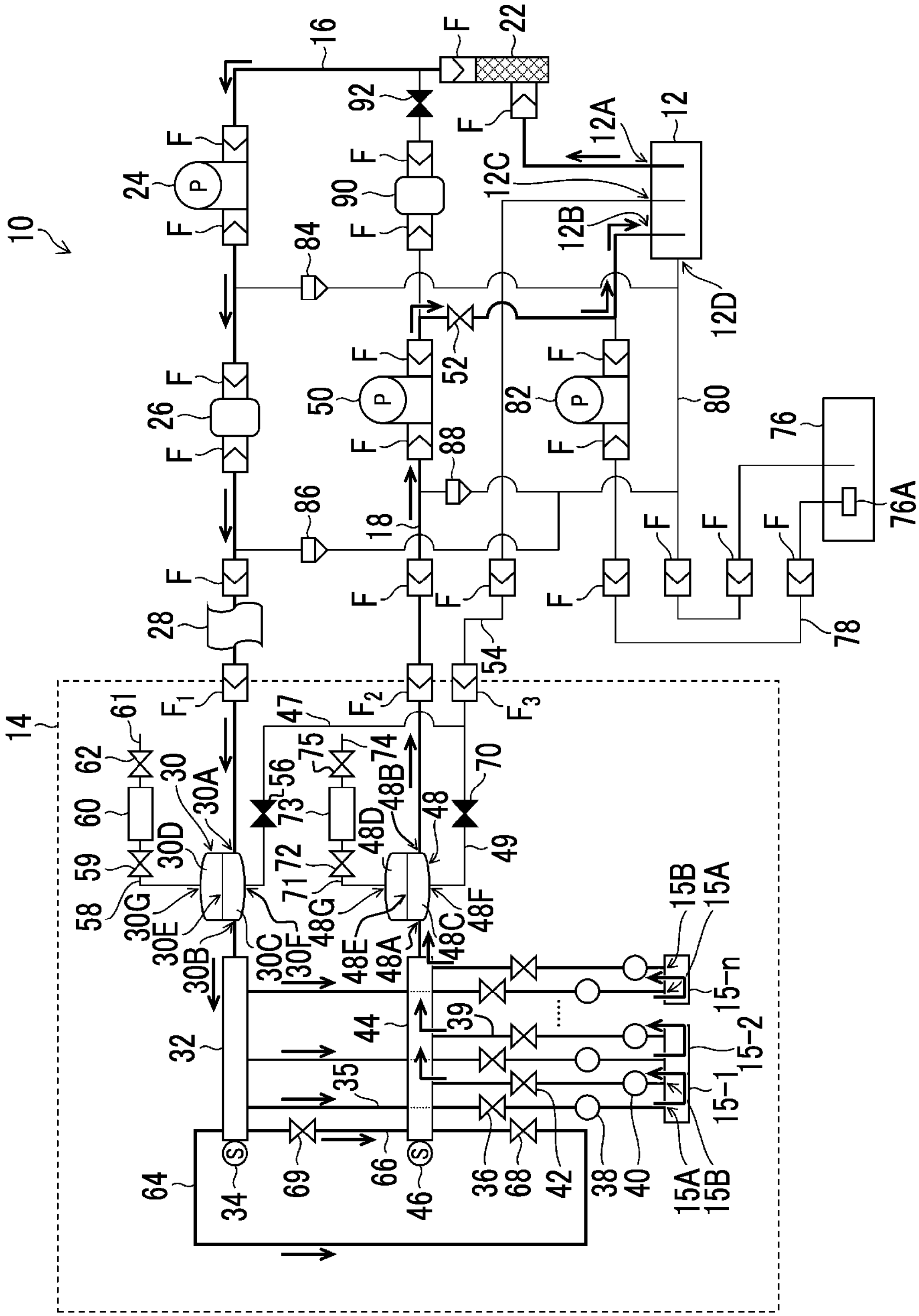
FIG. 4 is a diagram showing an ink flow in ink circulation during a printing period.

Normal circulation in a non-printing period of the ink supply device 10 will be described. FIG. 4 is a diagram showing an ink flow in ink circulation during a printing period. The arrow line shown in FIG. 4 indicates a flow direction of the ink.

During the printing period in which the ink is consumed in the ink jet bar 14, the ink supply device 10 executes the ink circulation. The ink flowing out from the supply port 12A of the buffer tank 12 during the printing period is supplied to the ink jet bar 14 via the supply flow passage 16. The ink that is not consumed in the ink jet bar 14 is returned to the recovery port 12B of the buffer tank 12 via the recovery flow passage 18. Here, among the various valves shown in FIG. 4, the outline supply valve 36 and the like represent an opened state. Among the various valves, the black-painted drain valve 56 and the like represent a closed state. The same applies to FIG. 7, FIG. 11, FIG. 12, and FIG. 15 to FIG. 19.

Figure 5:
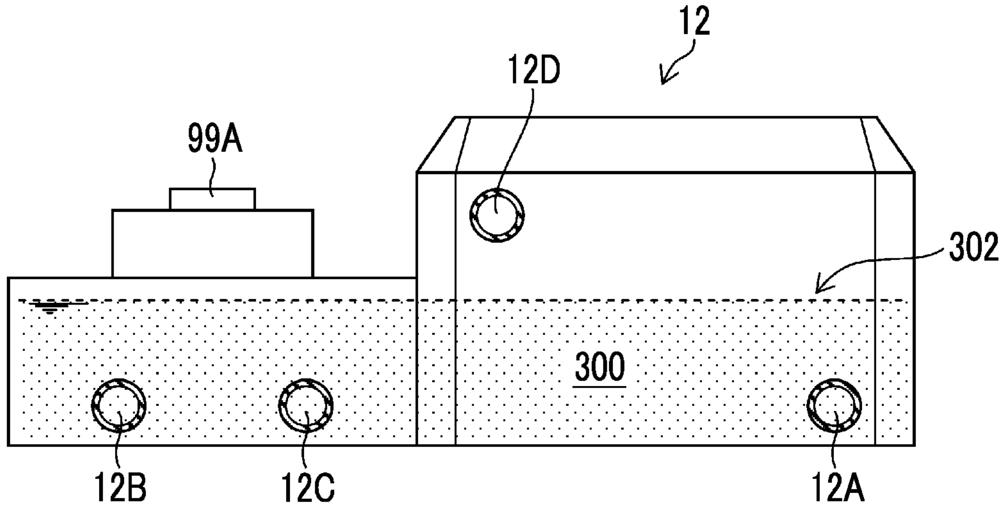
FIG. 5 is an explanatory diagram of a liquid level height of the buffer tank during the printing period.

FIG. 5 is an explanatory diagram of a liquid level height of the buffer tank during the printing period. A liquid level height 302 of ink 300 stored in the buffer tank 12 during the printing period is at a position sufficiently higher than an upper end position of the recovery port 12B.

That is, a sufficient amount of the ink is stored in the buffer tank 12 during the printing period. As a result, it is possible to cope with the ink consumption of the ink jet bar 14 and to contribute to the stability of the temperature of the ink.

Figure 6:
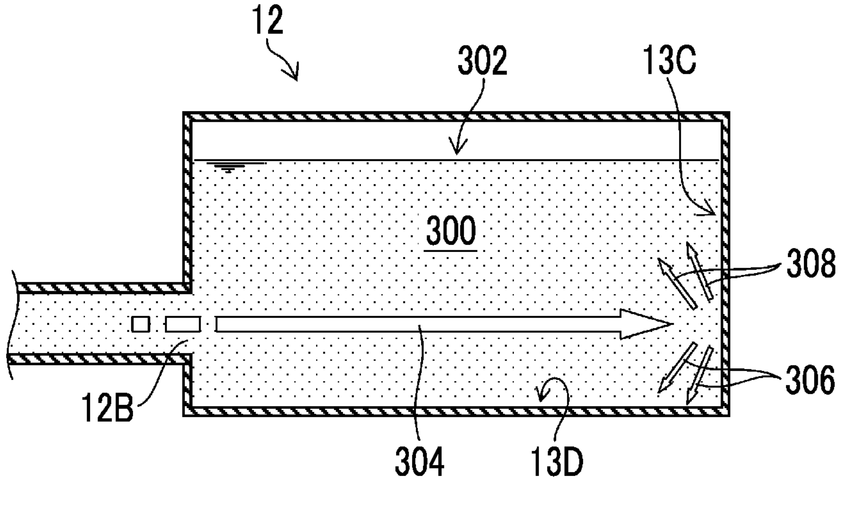
FIG. 6 is a schematic diagram showing an ink flow in the buffer tank during the printing period.

FIG. 6 is a schematic diagram showing an ink flow in the buffer tank during the printing period. In a case in which a sufficient amount of the ink 300 is stored in the buffer tank 12, a flow of the ink 300 generated inside the buffer tank 12 spreads throughout the buffer tank 12.

That is, an ink flow 304 flowing into the buffer tank 12 from the recovery port 12B collides with an inner side surface 13C of the buffer tank 12 facing the recovery port 12B, and a downward ink flow 306 and an upward ink flow 308 are generated.

Then, an effect of making distribution generated in the ink uniform, such as an effect of allowing sedimenting particles such as pigment particles precipitating on a bottom surface 13D of the buffer tank 12 to flow, and an effect of making a temperature distribution of the ink uniform, which are caused by the flow of the ink 300 generated inside the buffer tank 12, is not sufficient. Here, the term "downward" represents a direction having a component in a direction of gravitational force. The term "upward" represents a direction having a component in a direction opposite to the direction of gravitational force.

Figure 7:
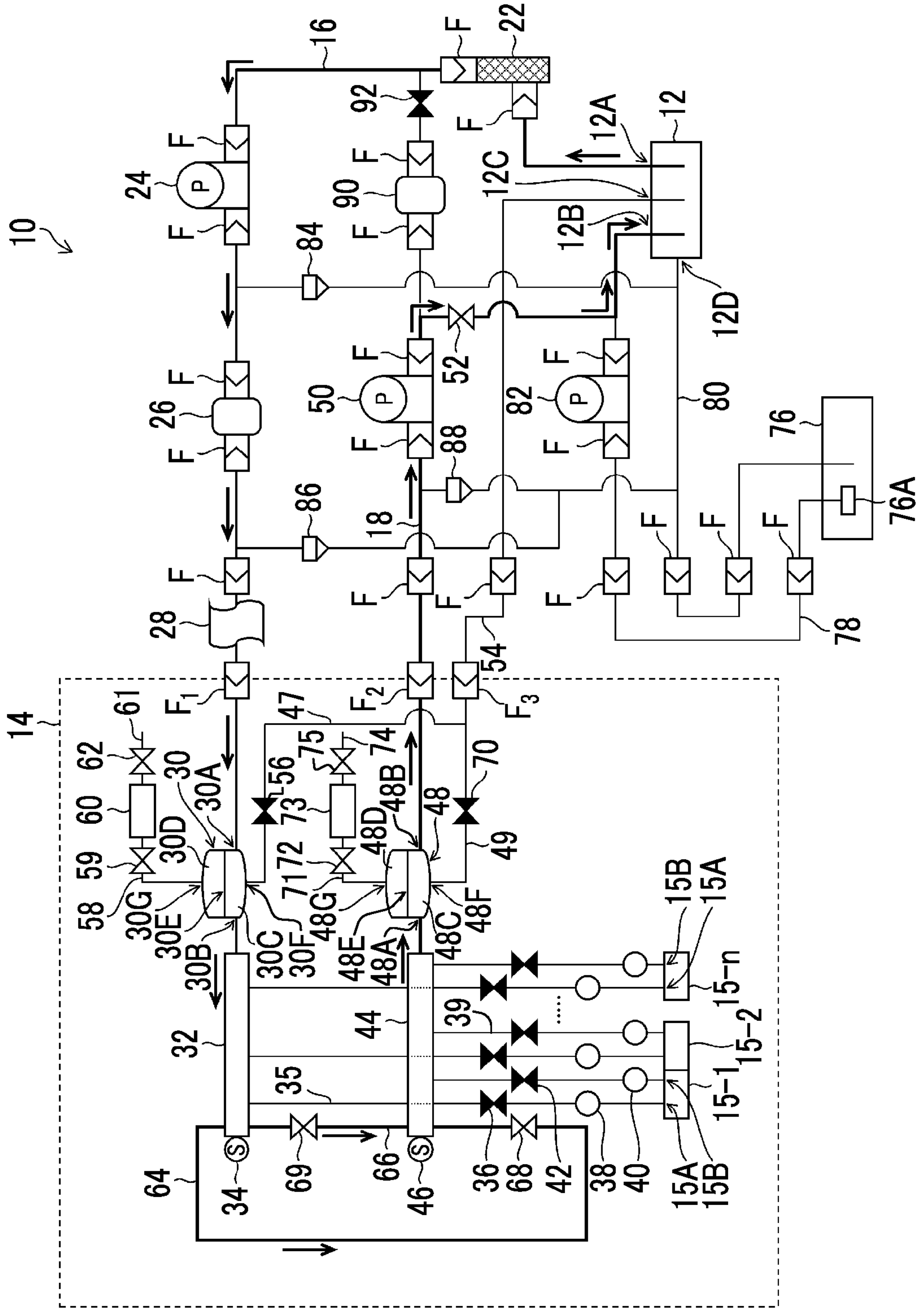
FIG. 7 is a diagram showing an ink flow in normal circulation during a non-printing period.

FIG. 7 is a diagram showing an ink flow in normal circulation during the non-printing period. For the ink circulation during the non-printing period, a flow passage through which the ink does not flow to the head module 15 is applied with the supply valve 36 and the recovery valve 42 in a closed state.

In the example shown in FIG. 7, the ink supply device 10 operates the supply pump 24 to supply the ink from the supply port 12A of the buffer tank 12 to the ink jet bar 14 via the supply flow passage 16.

The ink supplied to the ink jet bar 14 is discharged from the joint $F_2$ to the recovery flow passage 18 via the supply-side back pressure tank 30, the supply-side head manifold 32, the first bypass flow passage 64, the second bypass flow passage 66, the recovery-side head manifold 44, and the recovery-side back pressure tank 48.

The ink supply device 10 operates the recovery pump 50 to recover the ink discharged from the ink jet bar 14 to the recovery flow passage 18, to the buffer tank 12, via the recovery flow passage 18 and the recovery port 12B.

Figure 8:
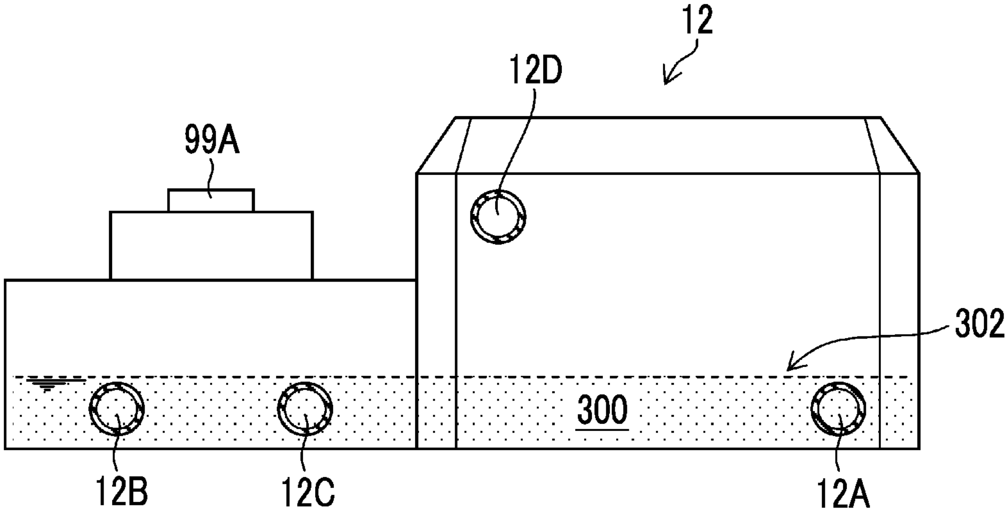
FIG. 8 is an explanatory diagram of a liquid level height of the buffer tank during the non-printing period.

FIG. 8 is an explanatory diagram of a liquid level height of the buffer tank during the non-printing period. In a case in which the ink circulation during the non-printing period is executed, the ink supply device 10 discharges the ink 300 stored in the buffer tank 12 to lower the liquid level height 302 of the ink 300. FIG. 8 shows an example in which the liquid level height 302 of the ink 300 is lowered to a position where the recovery port 12B is connected.

Figure 9:
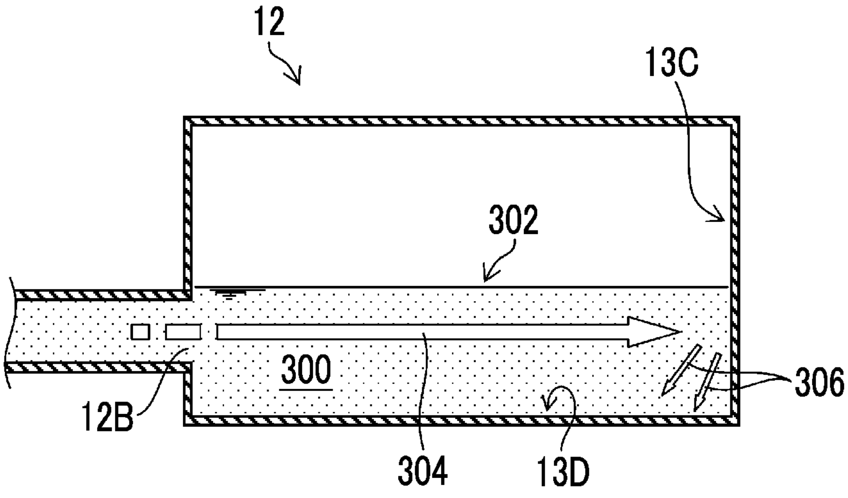
FIG. 9 is a schematic diagram showing an ink flow in the buffer tank during the non-printing period.

FIG. 9 is a schematic diagram showing the ink flow in the buffer tank during the non-printing period. In a case in which a circulation amount of the ink per unit period in the non-printing period is not changed with respect to the printing period, a cross-sectional area of the ink flowing inside the buffer tank 12 in the non-printing period is decreased with respect to the printing period. Then, the flow velocity of the ink in the non-printing period is increased with respect to the printing period, and the effect of making the distribution of the ink uniform, such as the effect of allowing sedimenting particles such as pigment particles precipitating on the bottom surface 13D of the buffer tank 12 to flow, is sufficiently obtained.

As shown in FIG. 9, the ink flow 304 flowing into the buffer tank 12 from the recovery port 12B collides with the inner side surface 13C of the buffer tank 12, and the downward ink flow 306 is generated. On the other hand, the upward ink flow 308 shown in FIG. 6 is not generated.

That is, an ink circulation method according to the embodiment has an effect of suppressing the sedimentation of the pigment particles on the bottom surface 13D of the buffer tank 12. In addition, the ink circulation method according to the embodiment has an effect in which uniformization of the temperature of the ink stored in the buffer tank 12 is promoted.

A relatively fast ink flow promotes stirring of the ink inside the buffer tank 12 to preferably perform control of the recovery pump 50 in which the amount of the ink flowing into the buffer tank 12 per unit time is increased in a range where a performance of the recovery pump 50 is acceptable.

Note that in a case in which pressure control in the head module 15 is unstable, an abnormality of the head module 15, such as ink leakage from the head module 15 and air intrusion into the head module 15, may occur. Therefore, in a case of executing the ink circulation in the non-printing period, the flow of the ink into the head module 15 is blocked. The amount of the ink to be increased, which is described in the embodiment, is an example of a flow rate of a liquid to be increased.

It is preferable that the ink circulation according to the embodiment is executed at start-up of the printing system comprising the ink jet bar 14 and at shut-down of the printing system. In addition, the ink circulation according to the embodiment may be performed during a non-operating period of the printing system. In particular, it is preferable to execute the ink circulation according to the embodiment before executing the ink circulation shown in FIG. 4, at the start-up of the printing system.

The ink in which the sedimentation of the pigment particles is a problem is mainly white ink in which titanium oxide is applied to the pigment particles. An example of a density of the pigment particles in the white ink is 4.2 grams per cubic centimeter.

In order to confirm the presence or absence of the sedimentation of the pigment particles on the bottom surface 13D of the buffer tank 12, a method of extracting the ink in an upper part and the ink in a lower part of the buffer tank 12 and comparing masses of the pigment particles contained therein can be applied. In a case of the white ink, moisture is evaporated for each of the ink in the upper part and the ink in the lower part of the buffer tank 12, and the mass of the solid content of the remaining pigment particles can be measured. Based on a measurement result of the mass, whether or not the ink 300 inside the buffer tank 12 is in an appropriate concentration range can be recognized.

[Liquid Level Height]

Figure 10:
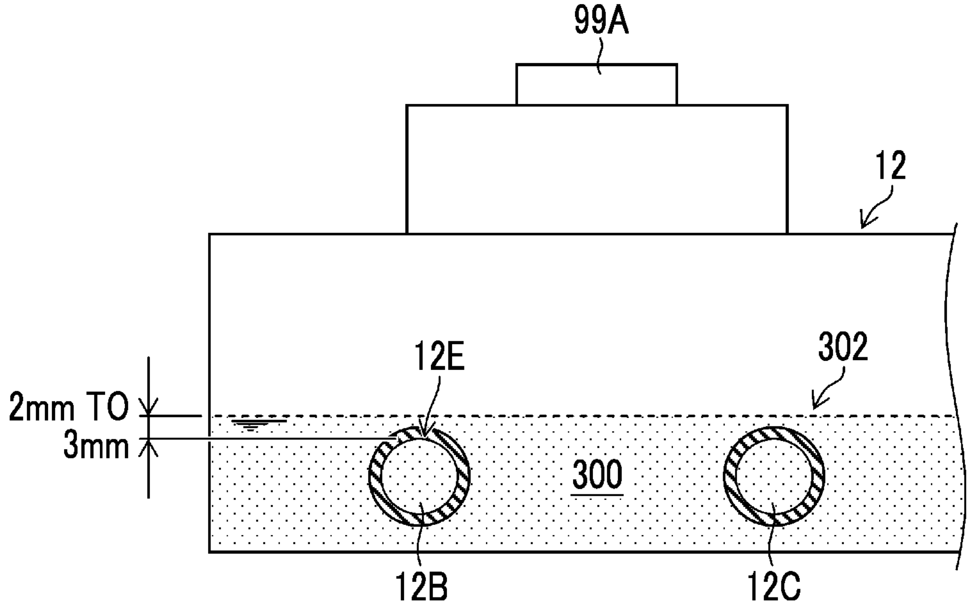
FIG. 10 is an explanatory diagram of the liquid level height of the buffer tank during the non-printing period.

FIG. 10 is an explanatory diagram of the liquid level height of the buffer tank during the non-printing period. The liquid level height 302 of the ink 300 in the buffer tank 12 during the non-printing period may be lowered as much as possible. In a case in which the liquid level height 302 of the ink 300 is lowered to a position of the recovery port 12B, and the liquid level height 302 is lowered to a position lower than an upper end position 12E of the recovery port 12B, air may be entrained from the recovery port 12B into the buffer tank 12. Therefore, the liquid level height 302 of the ink 300 is located at a position above the upper end position 12E of the recovery port 12B.

In consideration of fluctuations in the ink flow caused by the pulsation of the recovery pump 50 and the like and individual variations in the recovery pump 50 and the like, a distance between the liquid level height 302 of the ink 300 and the upper end position 12E of the recovery port 12B is preferably 2 mm or more and 3 mm or less.

In a case in which the heights of the supply port 12A, the recovery port 12B, and the bypass port 12C are different, the liquid level height 302 of the ink 300 is preferably at a position above an upper end position of the highest of the supply port 12A, the recovery port 12B, and the bypass port 12C.

As an example of lowering the liquid level height 302 of the ink 300 in the buffer tank 12, there is an aspect in which the replenishment pump 82 is operated to feed the ink from the recovery port 12B to the ink main tank 76 via the replenishment flow passage 78.

As another example of lowering the liquid level height 302 of the ink 300 in the buffer tank 12, there is an aspect in which the supply pump 24 is operated to feed the ink from the supply port 12A to the ink jet bar 14 via the supply flow passage 16 and the ink is discharged via the head module 15.

In addition, the liquid level height 302 of the ink 300 in the buffer tank 12 may be lowered by providing a discharge port in the buffer tank 12 and opening a valve provided in the discharge port to discharge the ink from the buffer tank 12 via the discharge port.

In a case in which the liquid level height 302 of the ink 300 in the non-printing period is returned to the liquid level height 302 of the ink 300 in the printing period, the replenishment pump 82 is operated to supply the ink from the ink main tank 76 to the buffer tank 12.

[Circulation Using Bypass Flow Passage]

In the buffer tank 12, the ink is jetted from a narrow flow passage connected to the recovery port 12B to a portion where the ink is pooled in the buffer tank 12, so that the ink flows vigorously from the recovery port 12B from which the ink is blown out to the inner side surface 13C facing the recovery port 12B. As a result, the ink tends to flow downward in the inside of the buffer tank 12, and an effect of allowing the sedimenting particles to flow is obtained.

On the other hand, in a case in which the ink is allowed to flow backward with respect to the normal circulation and the ink is allowed to flow into the buffer tank 12 from the supply port 12A and the bypass port 12C, the ink is not returned vigorously to the buffer tank 12, and it is difficult to allow the particles sedimenting in the vicinity of the bottom surface 13D of the buffer tank 12 to flow by using an effect of the momentum of the ink blowing out.

Therefore, an ink flow different from that in the normal circulation is generated, the ink is returned to the buffer tank 12 from the supply port 12A and the bypass port 12C, and the particles sedimenting in the vicinity of the bottom surface 13D of the buffer tank 12 are ejected.

Figure 11:
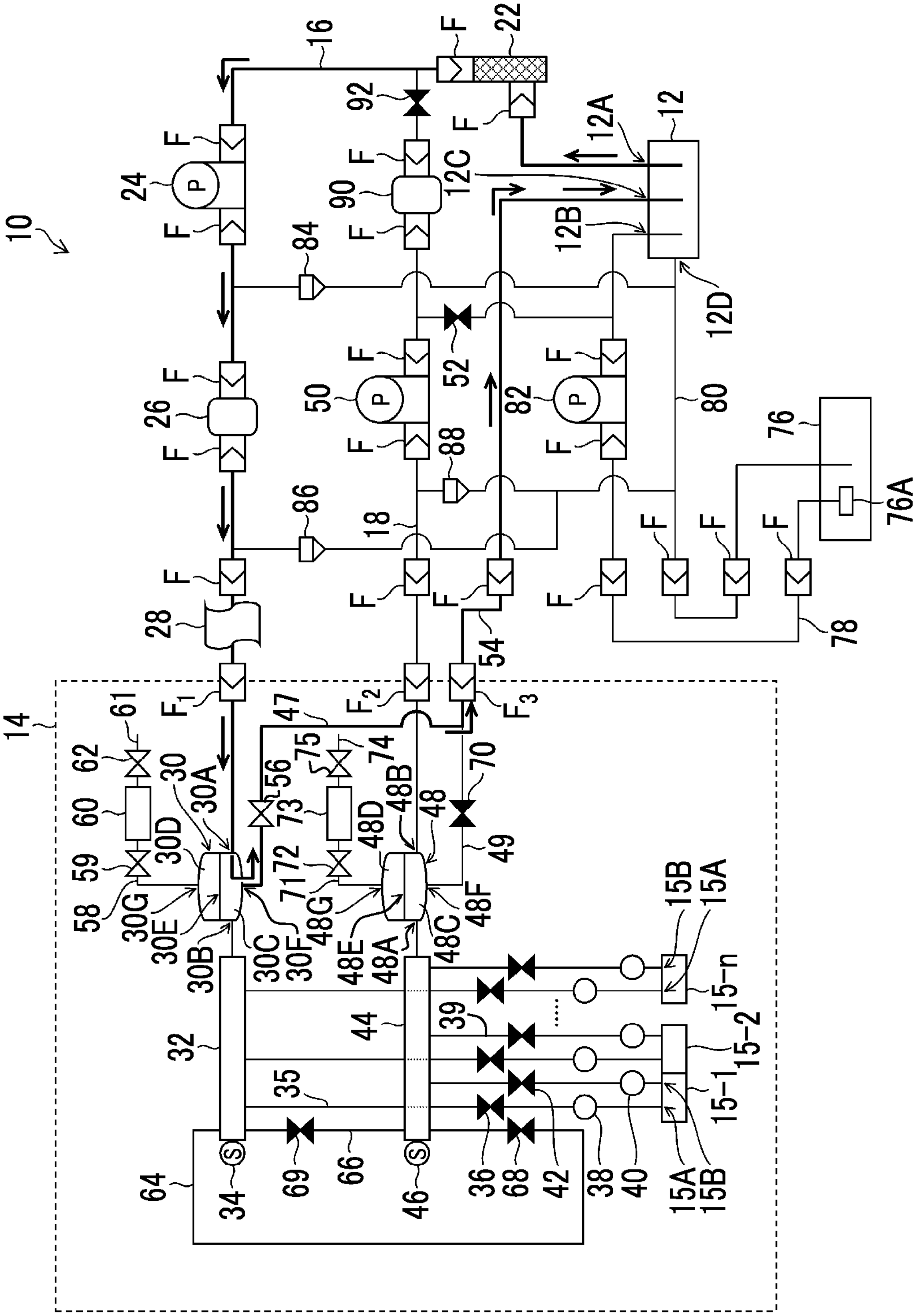
FIG. 11 is a diagram showing an ink flow in normal circulation using a bypass flow passage.

FIG. 11 is a diagram showing an ink flow in normal circulation using the bypass flow passage. In the normal circulation using the bypass flow passage 54, the bypass flow passage 54 is applied and the ink flows into the inside of the buffer tank 12 from the bypass port 12C in a case in which the ink is fed from the ink jet bar 14 to the buffer tank 12. As a result, the ink flows vigorously from the bypass port 12C into the inside of the buffer tank 12, and the sedimenting particles are likely to flow in the vicinity of the bypass port 12C.

Figure 12:
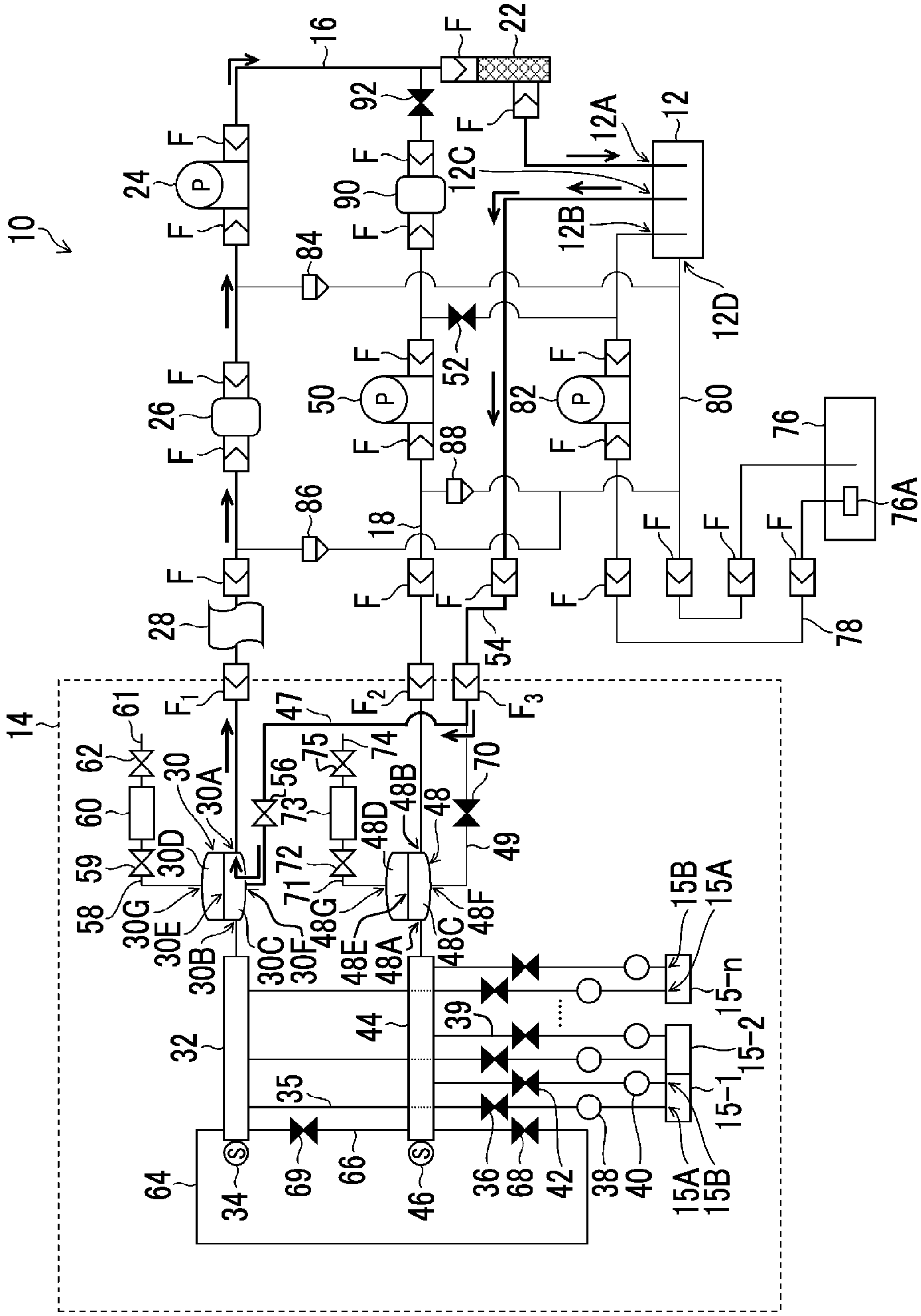
FIG. 12 is a diagram showing an ink flow in reverse circulation using the bypass flow passage.

FIG. 12 is a diagram showing an ink flow in reverse circulation using the bypass flow passage. In the reverse circulation using the bypass flow passage, the ink flow is in a direction opposite to the normal circulation. That is, in a case in which the ink is fed from the buffer tank 12 to the ink jet bar 14, the supply pump 24 is reversely operated with respect to the normal circulation, the ink is discharged from the bypass port 12C, and the bypass flow passage 54 is applied to feed the ink from the buffer tank 12 to the ink jet bar 14.

In addition, in a case in which the ink is fed from the ink jet bar 14 to the buffer tank 12, the supply flow passage 16 is applied to allow the ink to flow into the inside of the buffer tank 12 from the supply port 12A. As a result, the ink flows vigorously from the supply port 12A into the inside of the buffer tank 12, and the sedimenting particles are likely to flow in the vicinity of the supply port 12A.

The reverse circulation using the bypass flow passage 54 may have a problem that the ink that does not pass through the supply-side filter 26 flows into the ink jet bar 14. The ink that does not pass through the supply-side filter 26 may contain particles having a size that affects the jetting of the head module 15.

Therefore, in a case in which the reverse circulation using the bypass flow passage 54 is executed, the normal circulation is executed after the reverse circulation, and the ink that does not pass through the supply-side filter 26 is recovered in the buffer tank 12. As a result, occurrence of the jetting abnormality of the head module 15 due to the supply of the ink that does not pass through the supply-side filter 26 to the head module 15 is suppressed.

The normal circulation after the reverse circulation is executed before the start of the circulation in the printing period. In the normal circulation after the reverse circulation, the ink having a volume exceeding a volume of the ink supplied to the ink jet bar 14 in the reverse circulation is recovered in the buffer tank 12.

For example, a rotation speed of the supply pump 24 is fixed, and a period exceeding an execution period of the reverse circulation is defined as an execution period of the normal circulation after the reverse circulation. In addition, using a detection result of the liquid level detection sensor 99A provided in the buffer tank 12, a volume of ink flowing out from the buffer tank 12 and a volume of ink recovered in the buffer tank 12 are derived, and the supply pump 24 may be controlled based on a comparison result of the both volumes.

The ink that does not pass through the supply-side filter 26 described in the embodiment is an example of a liquid that has not passed through the filter. The normal circulation and the reverse circulation described in the embodiment are examples of liquid circulation.

[Modification Example of Buffer Tank]

Figure 13:
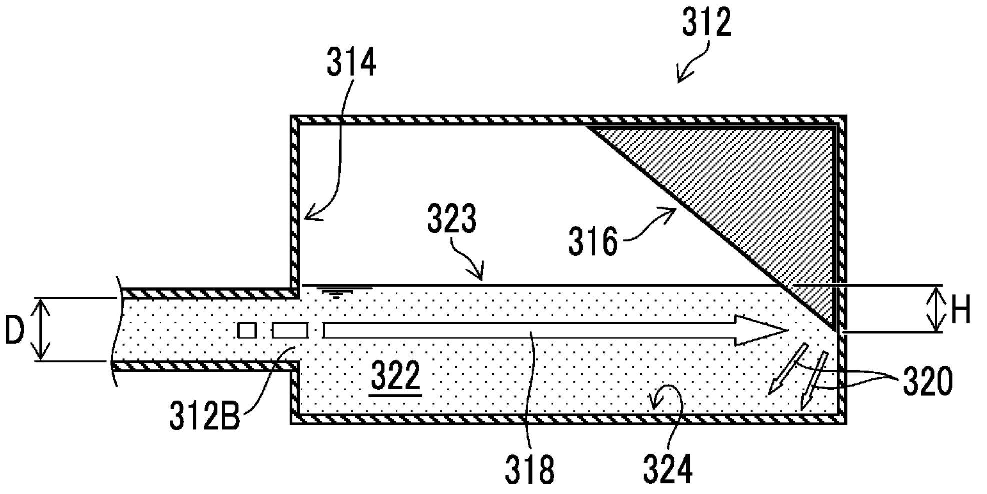
FIG. 13 is a cross-sectional view of a buffer tank showing a structural example of a buffer tank according to a modification example.

FIG. 13 is a cross-sectional view of a buffer tank showing a structural example of a buffer tank according to a modification example. In a buffer tank 312 shown in FIG. 13, a downward surface 316 facing an inner side surface 314 on which a recovery port 312B is formed and including a position facing the recovery port 312B is formed.

The ink that has flowed into the buffer tank 12 from the recovery port 312B has an ink flow 318 toward the downward surface 316. The ink that has collided with the downward surface 316 is induced downward, and a downward ink flow 320 is generated. As a result, ink 322 stored in the buffer tank 312 generates a flow, and the sedimentation of particles is suppressed.

In a state in which a liquid level height 323 of the ink 322 in the buffer tank 312 is lowered, at least a part of the downward surface 316 is immersed in the ink 322. A height H of a portion of the downward surface 316 immersed in the ink 322 may be equal to or greater than a diameter D of the recovery port 312B. A length of the downward surface 316 in a width direction may be equal to or greater than the diameter D of the recovery port 312B.

Here, a height of the downward surface 316 is a length of the downward surface 316 in a direction orthogonal to a bottom surface 324. The width direction of the downward surface 316 is a direction parallel to the bottom surface 324 and a direction parallel to the surface on which the recovery port 312B is formed. An inner diameter of the recovery port 312B is applied to the diameter D of the recovery port 312B.

As the angle of the downward surface 316 with respect to the bottom surface 324, any angle in a range of more than 0 degrees and less than 90 degree can be applied. The angle of the downward surface 316 with respect to the bottom surface 324 is preferably any angle in a range of 30 degrees or more and 45 degrees or less. FIG. 13 shows the downward surface 316 to which a flat surface is applied. The downward ink flow 320 need only be generated, and the downward surface 316 may be a curved surface, or a plurality of types of surfaces, such as a combination of a flat surface and a curved surface, may be combined.

A flat structure in which ink does not stagnate is applied to the bottom surface 13D of the buffer tank 12 shown in FIG. 6 and the like and the bottom surface 324 of the buffer tank 312 shown in FIG. 13. The term "flat" means that the bottom surface 13D or the like has a certain flatness. The term "flat" may indicate that a surface roughness of the bottom surface 13D or the like is smaller than a predetermined value.

Figure 14:
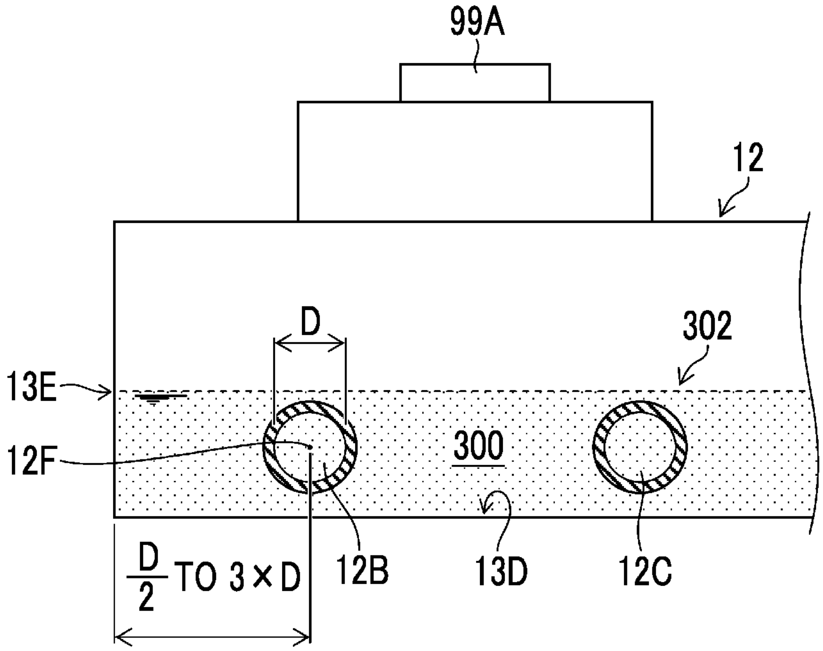
FIG. 14 is an explanatory diagram of an arrangement example of a recovery port.

FIG. 14 is an explanatory diagram of an arrangement example of the recovery port. The recovery port 12B may be disposed in the vicinity of an end 13E of the buffer tank 12. That is, a distance between the end 13E on a side of the recovery port 12B of the buffer tank 12 and a center 12F of the recovery port 12B may be equal to or more than half of an inner diameter D of the recovery port 12B, and may be equal to or less than three times the inner diameter D of the recovery port 12B. As a result, the stagnation of the ink in a region on the side of the end 13E with respect to the recovery port 12B of the buffer tank 12 can be suppressed.

As for the supply port 12A shown in FIG. 3 and the like, a distance from an end on a side of the supply port 12A of the buffer tank 12 may be equal to or more than half of a diameter of the supply port 12A, and may be equal to or less than three times the diameter of the supply port 12A. As a result, the stagnation of the ink in a region on the end side with respect to the supply port 12A can be suppressed.

The buffer tank 12 is preferably subjected to a coating treatment on the bottom surface 13D such that the particles contained in the ink are less likely to adhere to the bottom surface 13D. Examples of the coating treatment include a fluorine coating. The buffer tank 12 may be subjected to a coating treatment such that the particles contained in the ink are less likely to adhere to the inner side surfaces other than the bottom surface 13D. The same applies to the buffer tank 312 shown in FIG. 13.

The end 13E on the side of the recovery port 12B of the buffer tank 12 described in the embodiment is an example of a side surface intersecting the surface on which the liquid inlet and outlet is disposed. The fluorine coating described in the embodiment is an example of a coating treatment in which a fluorine resin is applied as a coating material.

[Modification Example of Ink Circulation in Non-Printing Period]

Figure 15:
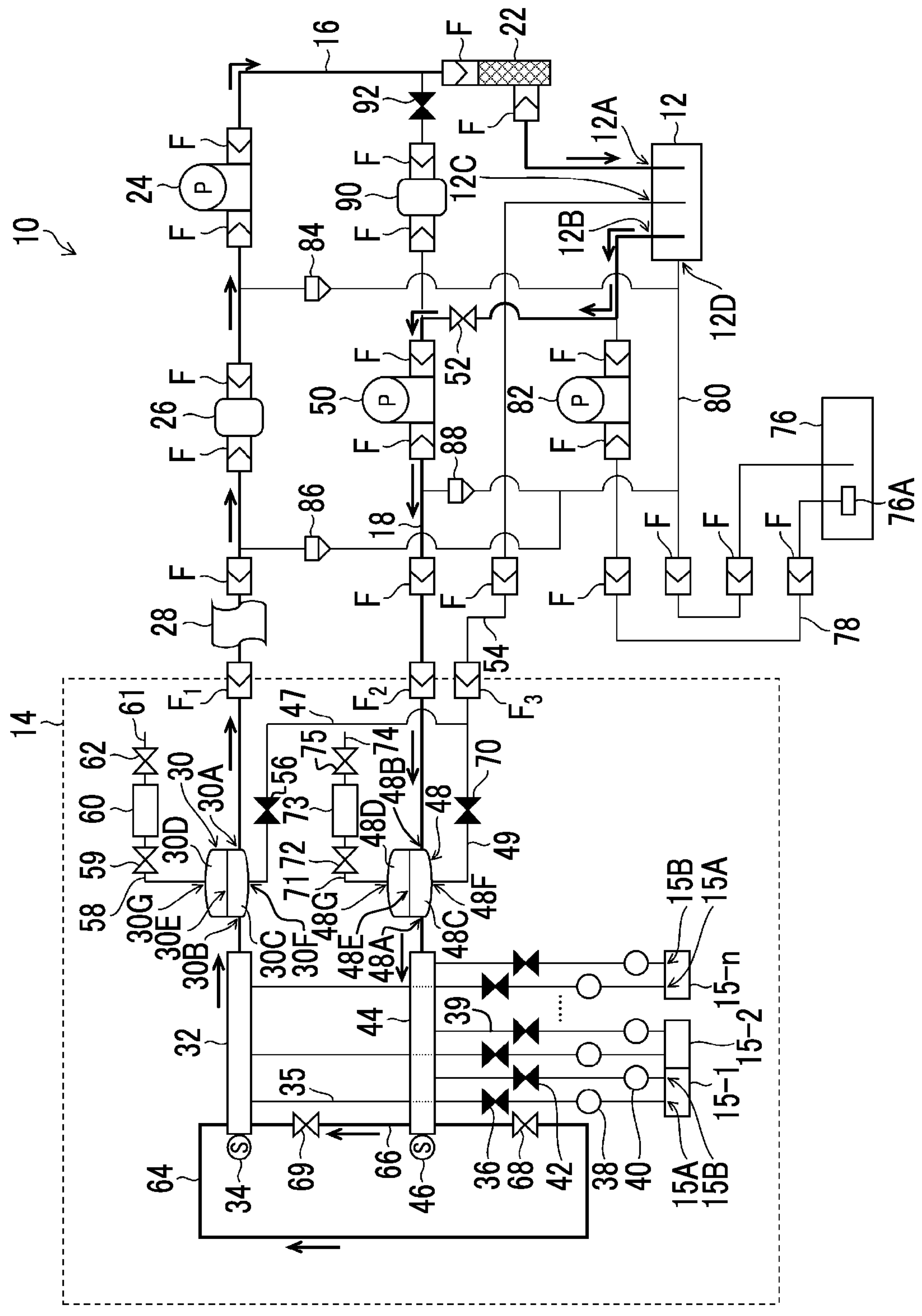
FIG. 15 is a diagram showing an ink flow in reverse circulation using a supply flow passage and a recovery flow passage.

FIG. 15 is a diagram showing an ink flow in reverse circulation using a supply flow passage and a recovery flow passage. In the reverse circulation shown in FIG. 15, the ink flows out from the recovery port 12B, and the ink is fed to the ink jet bar 14 via the recovery flow passage 18. In addition, the ink is fed from the ink jet bar 14 to the buffer tank 12 via the supply flow passage 16, and the ink flows into the buffer tank 12 from the supply port 12A.

After the reverse circulation, normal circulation in which the ink is fed from the buffer tank 12 to the ink jet bar 14 via the supply flow passage 16 and the ink is fed from the ink jet bar 14 to the buffer tank 12 via the recovery flow passage 18 is executed.

Figure 16:
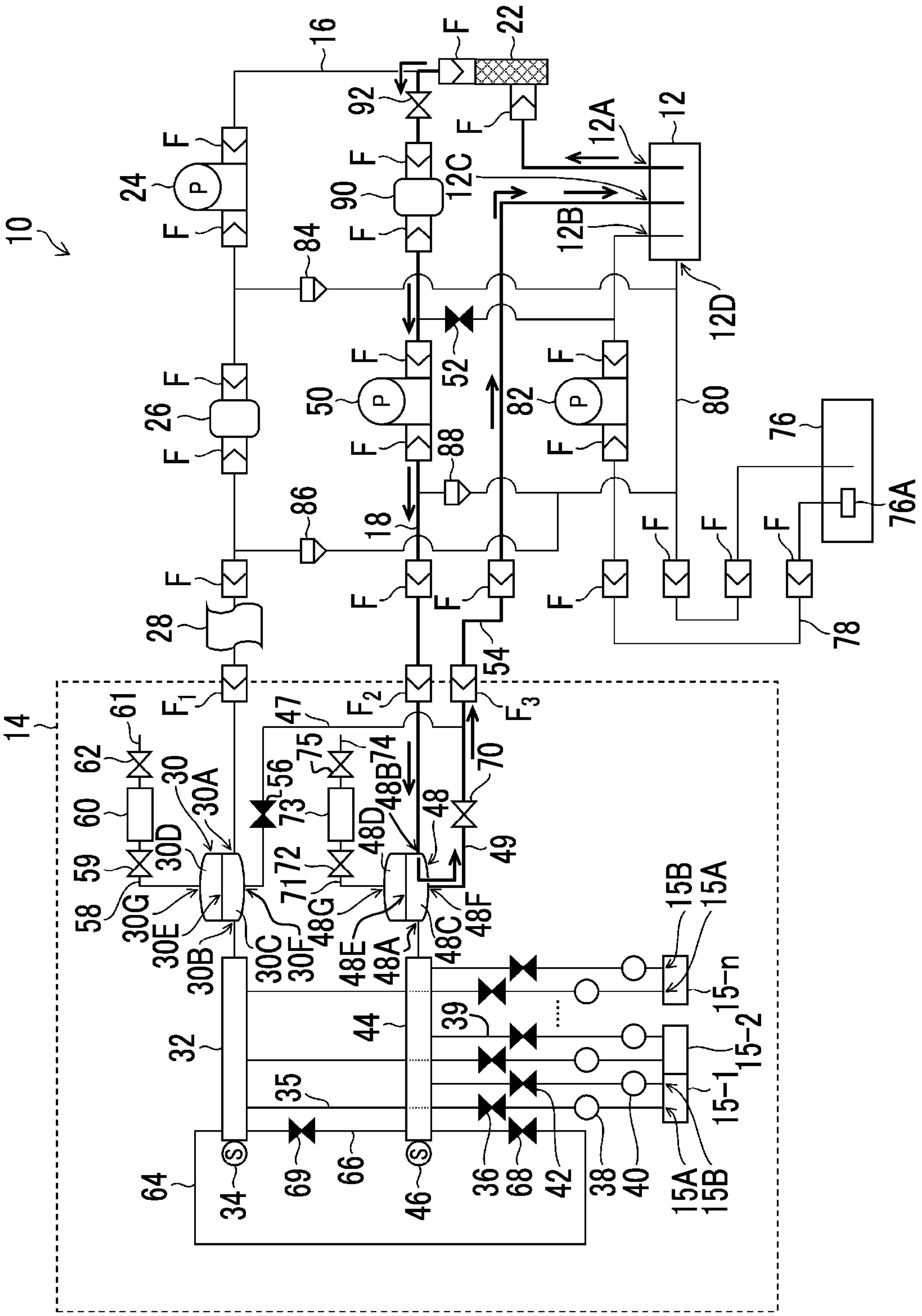
FIG. 16 is a diagram showing an ink flow in normal circulation using the recovery flow passage and the bypass flow passage.

FIG. 16 is a diagram showing an ink flow in normal circulation using the recovery flow passage and the bypass flow passage. In the normal circulation shown in FIG. 16, the ink flows out from the supply port 12A, the recovery pump 50 is operated, and the ink is fed from the buffer tank 12 to the ink jet bar 14 via the deaeration module 22, the recovery-side filter valve 92, and the recovery-side filter 90.

The ink that has flowed into the ink jet bar 14 passes through the recovery damper 40 and the drain flow passage 49, and flows out from the ink jet bar 14 via the joint $F_3$. Inside the ink jet bar 14, the first bypass flow passage valve 68 and the second bypass flow passage valve 69 are in a closed state such that ink flow is not generated from the recovery-side head manifold 44 to the supply-side head manifold 32, and the ink that has flowed out from the ink jet bar 14 via the joint $F_3$ flows through the bypass flow passage 54 and flows into the inside of the buffer tank 12 from the bypass port 12C.

Figure 17:
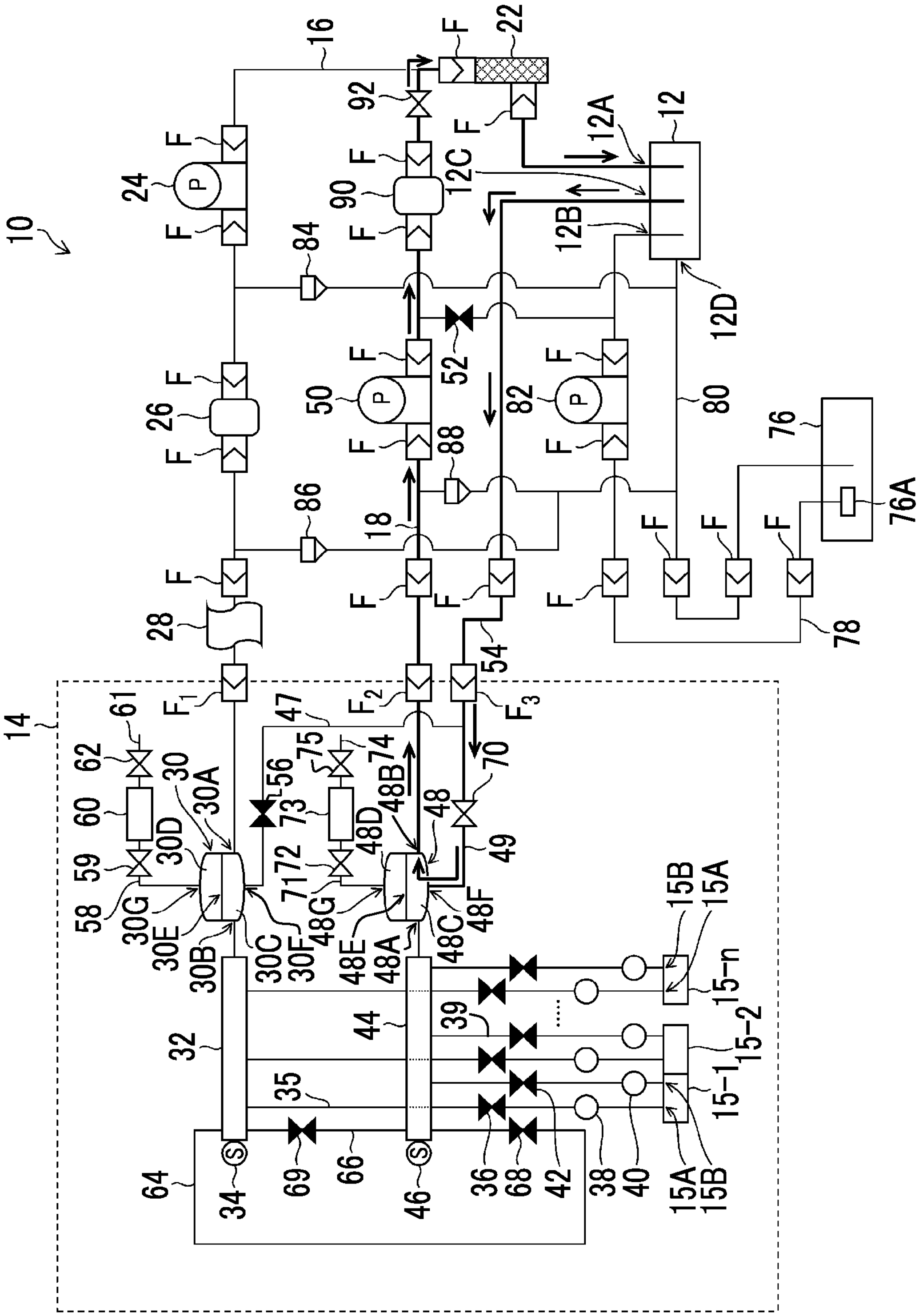
FIG. 17 is a diagram showing an ink flow in reverse circulation using the recovery flow passage and the bypass flow passage.

FIG. 17 is a diagram showing an ink flow in reverse circulation using the recovery flow passage and the bypass flow passage. In the reverse circulation shown in FIG. 17, the recovery pump 50 is operated to allow the ink to flow out from the bypass port 12C, and the ink is fed from the buffer tank 12 to the ink jet bar 14 via the bypass flow passage 54.

The ink flowing into the ink jet bar 14 passes through the drain flow passage 49 and the recovery damper 40, and flows out from the ink jet bar 14 via the joint $F_2$. Further, the ink is fed from the ink jet bar 14 to the buffer tank 12 via the recovery flow passage 18, the recovery-side filter valve 92, and the deaeration module 22. The ink, which is fed from the ink jet bar 14 to the buffer tank 12, flows into the inside of the buffer tank 12 via the supply port 12A.

In the ink circulation between the buffer tank 12 and the ink jet bar 14, the supply pump 24 may be operated to feed the ink from the buffer tank 12 to the ink jet bar 14 via the supply flow passage 16, and the supply pump 24 may be reversely operated to feed the ink from the ink jet bar 14 to the buffer tank 12 via the supply flow passage 16. In such an aspect, the recovery flow passage 18 and the bypass flow passage 54 may be applied instead of the supply flow passage 16, and the recovery pump 50 may be applied instead of the supply pump 24.

[Modification Example of Liquid Supply Device and Ink Jet Bar]

Figure 18:
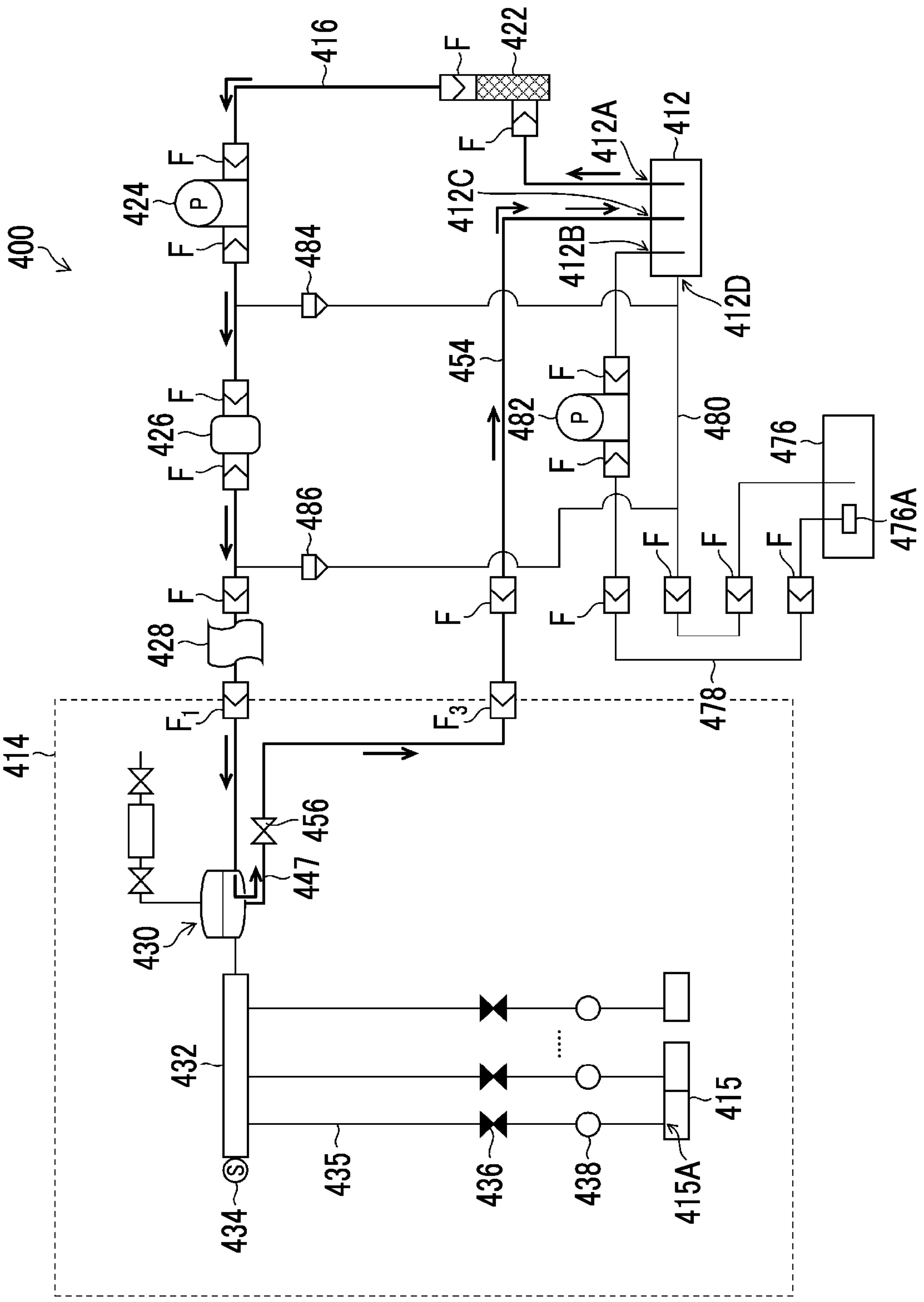
FIG. 18 is a diagram showing an ink flow in normal circulation applied to an ink supply device according to a modification example.

FIG. 18 is a diagram showing an ink flow in normal circulation applied to an ink supply device according to a modification example. An ink supply device 400 shown in FIG. 18 supplies ink to an ink jet bar 414. The ink jet bar 414 comprises components related to a supply-side back pressure tank 430 and a supply-side back pressure tank 430, but does not comprise the recovery damper 40 and the components related to the recovery damper 40 shown in FIG. 1. In FIG. 18, the reference numerals of the components related to the supply-side back pressure tank 430 are not shown.

The ink jet bar 414 comprises a head module 415. The head module 415 comprises an ink supply port 415A, but does not comprise the ink discharge port 15B shown in FIG. 1 and the like.

The ink jet bar 414 comprises a supply-side head manifold 432, a supply-side pressure sensor 434, an ink supply flow passage 435, a supply valve 436, and a supply damper 438, but does not comprise the ink recovery flow passage 39, the recovery damper 40, the recovery valve 42, and the recovery-side head manifold 44 shown in FIG. 1 and the like.

The ink jet bar 414 comprises a drain flow passage 447, a drain valve 456, a joint $F_1$, and a joint $F_3$, but does not comprise the drain flow passage 49, the drain valve 70, and the joint $F_2$ shown in FIG. 1 and the like.

The ink supply device 400 comprises a buffer tank 412, a supply flow passage 416, a deaeration module 422, a supply pump 424, a supply-side filter 426, and a heat exchanger 428. The ink supply device 400 comprises a bypass flow passage 454 and a plurality of joints F. The buffer tank 412 comprises a supply port 412A, a recovery port 412B, a bypass port 412C, and an overflow port 412D.

The ink supply device 400 comprises an ink main tank 476, a main tank filter 476A, a replenishment flow passage 478, an overflow passage 480, a replenishment pump 482, a first safety valve 484, and a second safety valve 486.

On the other hand, the ink supply device 400 does not comprise the recovery flow passage 18, the recovery pump 50, the recovery-side filter 90, and the recovery-side filter valve 92 shown in FIG. 1 and the like. The deaeration module 422 and the like shown in FIG. 18 have the same configuration and the same function as the deaeration module 22 and the like shown in FIG. 1.

In the normal circulation in the non-printing period, which is applied to the ink supply device 400 and the ink jet bar 414, the supply pump 424 is operated to allow the ink to flow out from the supply port 412A, and the ink is fed from the buffer tank 412 to the ink jet bar 414.

The ink that has flowed into the ink jet bar 414 flows out from the joint $F_3$ via the joint $F_1$, the supply-side back pressure tank 430, and the drain flow passage 447. The ink that has flowed out from the ink jet bar 414 flows into the buffer tank 412 from the bypass port 412C via the bypass flow passage 454.

Figure 19:
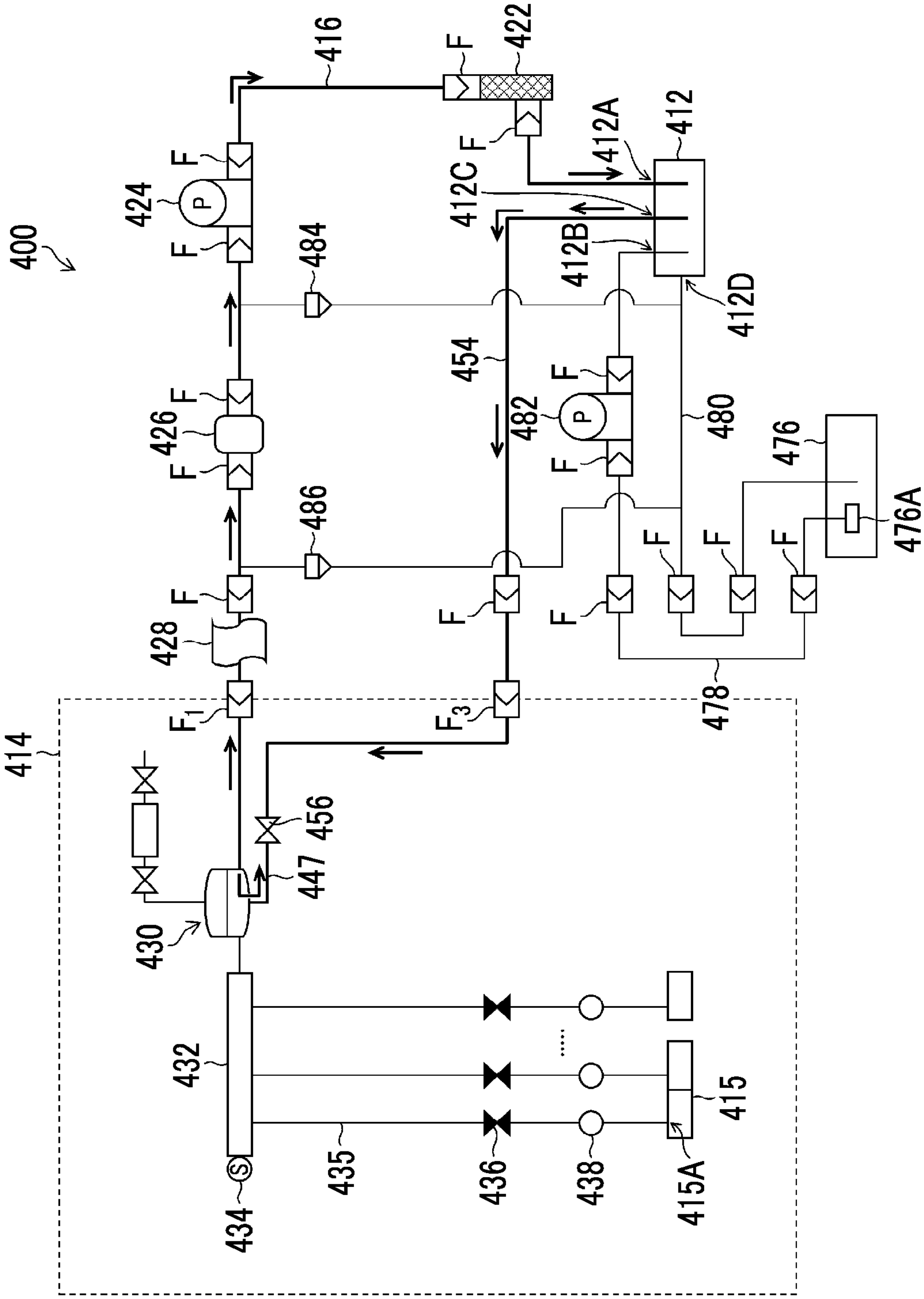
FIG. 19 is a diagram showing an ink flow in reverse circulation applied to the ink supply device according to the modification example.

FIG. 19 is a diagram showing an ink flow in reverse circulation applied to the ink supply device according to the modification example. In the reverse circulation in the non-printing period, which is applied to the ink supply device 400 and the ink jet bar 414, the supply pump 424 is reversely operated with respect to the normal circulation to allow the ink to flow out from the bypass port 412C, and the ink is fed from the buffer tank 412 to the ink jet bar 414.

The ink that has flowed into the ink jet bar 414 flows out from the joint $F_1$ via the joint $F_3$, the drain flow passage 447, and the supply-side back pressure tank 430. The ink that has flowed out from the ink jet bar 414 flows into the buffer tank 412 from the supply port 412A via the supply flow passage 416.

After the reverse circulation, the normal circulation shown in FIG. 18 is executed, and the ink flowing into the ink jet bar 414 without passing through the supply-side filter 426 is returned to the buffer tank 412 via the bypass flow passage 454.

In this way, the ink circulation in the non-printing period is also executed in the ink supply device 400 that does not comprise the recovery flow passage 18 and the like shown in FIG. 1. As a result, the ink flow inside the buffer tank 412 is promoted, and the generation of distribution in the ink such as the sedimentation of particles is suppressed. In FIG. 19, three head modules out of n pieces of the head modules 415 are illustrated.

[Ink Circulation Method]

Figure 20:
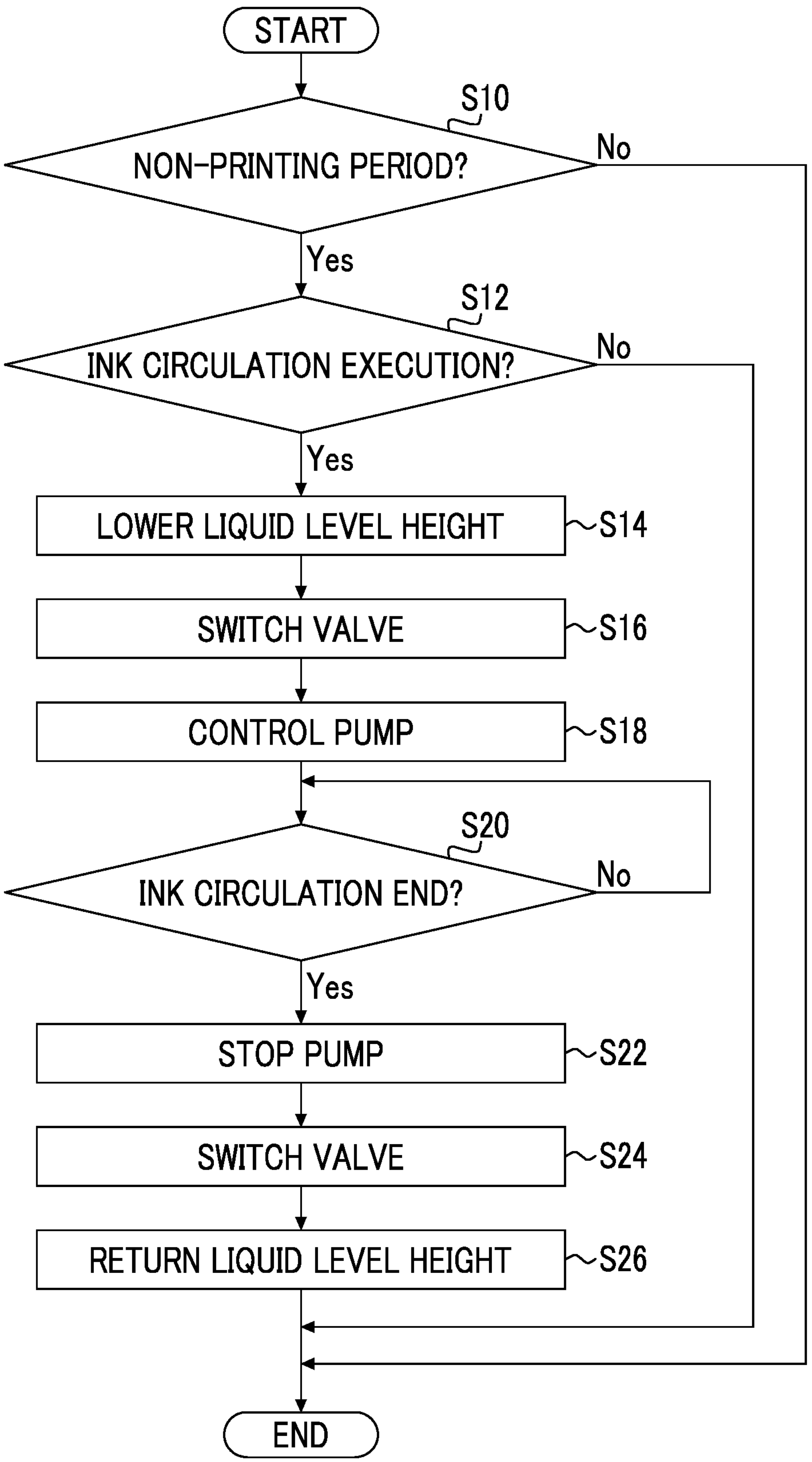
FIG. 20 is a flowchart showing a procedure of an ink circulation method according to an embodiment.

FIG. 20 is a flowchart showing a procedure of the ink circulation method according to the embodiment. In a non-printing period determination step S10, the general control unit 94 shown in FIG. 2 determines whether or not a non-printing period is set. In the non-printing period determination step S10, in a case in which the general control unit 94 determines that a printing period is set, No determination is made. In a case of the No determination, a procedure of the ink circulation method in the non-printing period is terminated, and the ink circulation is not executed.

On the other hand, in the non-printing period determination step S10, in a case in which the general control unit 94 determines that a non-printing period is set, Yes determination is made. In the case of the Yes determination, the process proceeds to an ink circulation execution determination step S12.

In the ink circulation execution determination step S12, the general control unit 94 determines whether or not to execute the ink circulation. In the ink circulation execution determination step S12, the general control unit 94 may determine whether or not an ink circulation execution condition is satisfied. An example of satisfying the ink circulation execution condition is an elapse of a predetermined period from the most recent execution of the ink circulation.

In the ink circulation execution determination step S12, in a case in which the general control unit 94 determines not to execute the ink circulation, No determination is made. In a case of the No determination, the ink circulation method is terminated, and the ink circulation is not executed.

On the other hand, in the ink circulation execution determination step S12, in a case in which the general control unit 94 determines to execute the ink circulation, Yes determination is made. In a case of the Yes determination, the process proceeds to a liquid level height adjustment step S14.

In the liquid level height adjustment step S14, the general control unit 94 discharges the ink from the buffer tank 12 shown in FIG. 1 to lower the liquid level height of the ink in the buffer tank 12 to a predetermined position.

In the liquid level height adjustment step S14, the general control unit 94 can perform feedback control based on the detection result of the liquid level detection sensor 99A. After the liquid level height adjustment step S14, the process proceeds to a circulation start valve switching step S16.

In the circulation start valve switching step S16, the valve control unit 97 switches various types of opening and closing of the drain valve 56 and the like shown in FIG. 1 to set a flow passage through which the ink passes. In addition, the valve control unit 97 closes the supply valve 36 and the recovery valve 42 to set non-supply of the ink to the head module 15. After the circulation start valve switching step S16, the process proceeds to a pump control step S18.

In the pump control step S18, the pump control unit 98 sets an operating condition for a pump applied to the ink circulation, such as the supply pump 24 shown in FIG. 1, starts the operation of the supply pump 24 or the like, and controls the operation of the supply pump 24 or the like. In the pump control step S18, the pump control unit 98 may perform feedback control of the supply pump 24 and the like according to the detection result of the supply-side pressure sensor 34 or the like. After the pump control step S18, the process proceeds to an ink circulation end determination step S20.

In the ink circulation end determination step S20, the general control unit 94 determines whether or not to end the ink circulation. In the ink circulation end determination step S20, the general control unit 94 may determine whether or not an ink circulation end condition is satisfied. An example of satisfying the ink circulation end condition is acquisition of a signal indicating an elapse of a predetermined period and end of the ink circulation.

In the ink circulation end determination step S20, in a case in which the general control unit 94 determines not to end the ink circulation, No determination is made. In a case of the No determination, the ink circulation is continued, and the ink circulation end determination step S20 is continued.

On the other hand, in the ink circulation end determination step S20, in a case in which the general control unit 94 determines to end the ink circulation, Yes determination is made. In a case of the Yes determination, the process proceeds to a pump stop step S22.

In the pump stop step S22, the pump control unit 98 stops the operation of the supply pump 24 or the like applied to the ink circulation. After the pump stop step S22, the process proceeds to a circulation end valve switching step S24.

In the circulation end valve switching step S24, the valve control unit 97 switches the opening and closing of the drain valve 56 or the like to set an ink flow passage according to processing after the ink circulation. After the circulation end valve switching step S24, the process proceeds to a liquid level height return step S26.

In the liquid level height return step S26, the pump control unit 98 operates the replenishment pump 82 to supply ink from the ink main tank 76 to the buffer tank 12 to return the liquid level height of the ink in the buffer tank 12. After the liquid level height return step S26, the general control unit 94 terminates the ink circulation method.

After the non-printing period determination step S10, a circulation direction selection step of selecting whether to execute normal circulation or reverse circulation may be executed. In a case in which the reverse circulation is selected, it is preferable to execute the normal circulation after the reverse circulation. The ink circulation method described in the embodiment is an example of a liquid circulation method.

Effects of Embodiment

The ink supply device according to the embodiment can obtain the following effects.

[1]

In a case in which the ink circulation is executed in the non-printing period in which the ink jet bar 14 is not operated, the liquid level height of the ink stored in the buffer tank 12 is lowered compared with the printing period. As a result, the ink flow on the bottom surface 13D and in the vicinity of the bottom surface 13D of the buffer tank 12 is promoted, and the sedimentation of particles contained in the ink and the generation of the ink distribution such as the temperature distribution of the ink are suppressed.

[2]

In a case in which the ink circulation in the non-printing period is executed, the flow velocity of the ink is relatively increased in a range where the performance of the pump is acceptable. As a result, stirring of the ink in the buffer tank 12 is promoted.

[3]

In a case in which the ink circulation in the non-printing period is executed, the ink flow into the head module 15 is blocked. As a result, the occurrence of abnormality in the head module 15, such as ink leakage in the head module 15 and air intrusion into the head module 15, is suppressed.

[4]

The distance between the liquid level height in the buffer tank 12 and the upper end position 12E of the recovery port 12B through which the ink flows into the buffer tank 12 is set to be 2 mm or more and 3 mm or less. As a result, it is possible to achieve both the promotion of stirring of the ink in the buffer tank 12 and the suppression of the intrusion of air from the recovery port 12B into the recovery flow passage 18 or the like.

[5]

The distance between the center 12F of the recovery port 12B through which the ink flows into the buffer tank 12 during the ink circulation in the non-printing period and the end 13E of the buffer tank 12 is set to be equal to or more than half of the diameter D of the recovery port 12B, and is set to be equal to or less than three times the inner diameter D of the recovery port 12B. As a result, the stagnation of the ink in the vicinity of the end 13E of the buffer tank 12 is suppressed. In a case in which the same configuration is applied to the end on the side of the supply port 12A and the supply port 12A, the same effects can be obtained.

[6]

The ink is normally circulated via the bypass flow passage 54. As a result, the ink flows vigorously from the bypass port 12C into the inside of the buffer tank 12, and the sedimentation of the ink around the bypass port 12C is suppressed.

[7]

The ink is reversely circulated via the bypass flow passage 54. As a result, the ink flows vigorously from the supply port 12A into the inside of the buffer tank 12, and the sedimentation of the ink around the supply port 12A is suppressed.

[8]

After the ink is reversely circulated, the normal circulation is executed. As a result, the ink that has flowed into the ink jet bar 14 without passing through the supply-side filter 26 can be discharged from the ink jet bar 14.

[9]

The downward surface 316 is provided on a surface of the buffer tank 312 facing the recovery port 312B. As a result, the ink that has flowed into the buffer tank 312 collides with the downward surface 316, and the generation of the downward ink flow 320 is promoted.

[10]

A flat structure is applied to the bottom surface 13D of the buffer tank 12. As a result, the stagnation of the ink on the bottom surface 13D of the buffer tank 12 is suppressed.

[11]

The bottom surface 13D of the buffer tank 12 is subjected to a coating treatment to promote the ink flow. As a result, the ink flow on the bottom surface 13D of the buffer tank 12 is promoted.

[Example of Application to Ink Jet Printing System]

Figure 21:
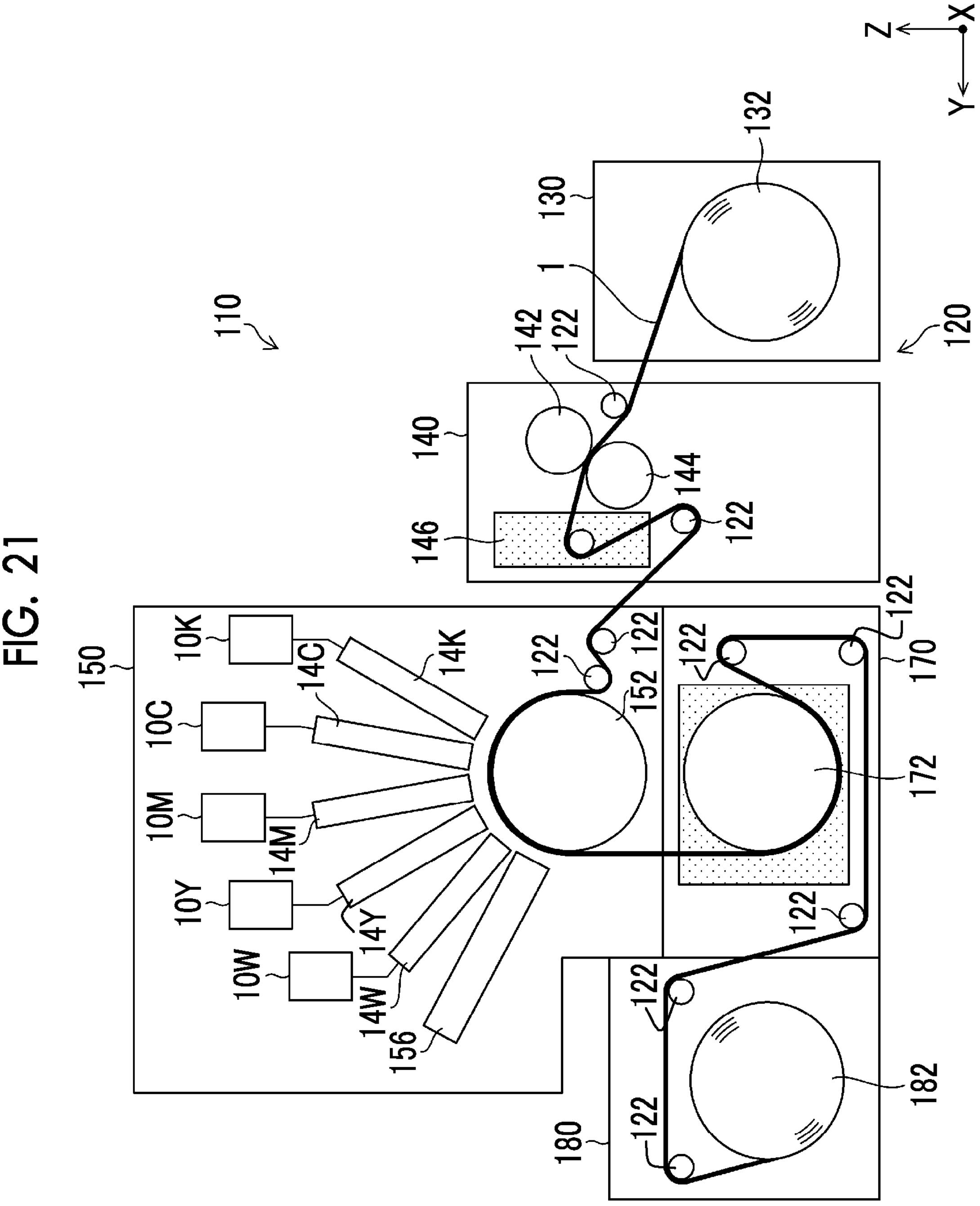
FIG. 21 is an overall configuration diagram of an ink jet printing system to which the ink supply device according to the embodiment is applied.

FIG. 21 is an overall configuration diagram of an ink jet printing system to which the ink supply device according to the embodiment is applied. A single-pass method is applied to an ink jet printing system 110 to execute single-pass printing.

In the ink jet printing system 110, a continuous body wound in a roll shape is applied as paper 1 which is a printing medium. An aspect in which a singled sheet is applied as the paper 1 may be used.

General-purpose printing paper may be used as the paper 1. The general-purpose printing paper is not so-called ink jet-dedicated paper, but paper mainly made of cellulose, such as coated paper used for general offset printing or the like. A material other than paper, such as resin, metal, and cloth, can be applied to the paper 1.

The ink jet printing system 110 comprises a conveying device 120, a delivery device 130, a pretreatment liquid coating device 140, a printing device 150, a drying device 170, and a winding device 180. Hereinafter, each device will be described in detail.

[Conveying Device]

A roll-to-roll method is applied to the conveying device 120. The conveying device 120 conveys the paper 1 from the delivery device 130 to the winding device 180 along a conveyance path. A conveyance direction of the paper 1 refers to a traveling direction of the paper 1 along the conveyance path of the paper 1 from the delivery device 130 to the winding device 180. In the following description, the conveyance direction of the paper 1 may be referred to as a paper conveyance direction.

The conveying device 120 comprises a plurality of pass rollers 122. The pass roller 122 functions as a guide roller that supports the paper 1 in the conveyance path of the paper 1. Each part of the above-described ink jet printing system 110 comprises one or more pass rollers 122.

The conveying device 120 includes a conveyance member that conveys the paper 1 in each part of the ink jet printing system 110. Examples of the conveyance member include a printing drum 152 provided in the printing device 150. The conveying device 120 may adopt an aspect in which the delivery device 130 and the winding device 180 are provided as components.

[Delivery Device]

A feeding roll 132 is placed on the delivery device 130. The feeding roll 132 has a form in which the unprinted paper 1 is wound around a reel that is rotatably supported. The reel is not shown.

[Winding Device]

A winding roll 182 is placed on the winding device 180. The winding roll 182 has a form in which the printed paper 1 is wound around a reel that is rotatably supported. One end of the paper 1 is connected to the reel. A rotation shaft of a motor that rotatably drives the reel is connected to the winding roll 182. The reel and the motor are not shown.

[Pretreatment Liquid Coating Device]

The pretreatment liquid coating device 140 is disposed in a paper conveyance path and is disposed at a position on an upstream side of the printing device 150 in the paper conveyance direction. The pretreatment liquid coating device 140 applies a pretreatment liquid to a printing surface of the paper 1. The pretreatment liquid is a liquid containing water and a component that aggregates or insolubilizes a coloring material component in aqueous ink to thicken the aqueous ink. The aqueous ink reacts with the pretreatment liquid and is thickened.

The pretreatment liquid coating device 140 comprises a coating roller 142, a facing roller 144, and a pretreatment liquid drying device 146. The paper 1 conveyed from the delivery device 130 is guided by the pass roller 122 and conveyed to a position facing the coating roller 142.

In the pretreatment liquid coating device 140, a roller coating method is applied in which the paper 1 is interposed between the coating roller 142 to which the pretreatment liquid is supplied and the facing roller 144, and the pretreatment liquid is applied to the printing surface of the paper 1. A liquid reservoir or the like in which the pretreatment liquid supplied to the coating roller 142 is stored is not shown.

A coating method of the pretreatment liquid applied to the pretreatment liquid coating device 140 is not limited to the roller coating method. For example, a coating method other than the roller coating method, such as a blade coating method using a blade, can be applied.

The paper 1 coated with the pretreatment liquid is subjected to a drying treatment using the pretreatment liquid drying device 146. As the pretreatment liquid drying device 146, a method of blowing hot air from a hot air heater onto the paper 1 can be applied. The paper 1 that has been subjected to the drying treatment using the pretreatment liquid coating device 140 is conveyed to the printing device 150.

[Printing Device]

The printing device 150 prints a color image on the printing surface of the paper 1. The printing device 150 comprises an ink jet bar 14K, an ink jet bar 14C, an ink jet bar 14M, an ink jet bar 14Y, and an ink jet bar 14W. The ink jet bar 14K, the ink jet bar 14C, the ink jet bar 14M, the ink jet bar 14Y, and the ink jet bar 14W jet black ink, cyan ink, magenta ink, yellow ink, and white ink, respectively.

Each of the ink jet bar 14K, the ink jet bar 14C, the ink jet bar 14M, the ink jet bar 14Y, and the ink jet bar 14W shown in FIG. 21 corresponds to the ink jet bar 14 shown in FIG. 1.

The printing device 150 comprises an ink supply device 10K, an ink supply device 10C, an ink supply device 10M, an ink supply device 10Y, and an ink supply device 10W. Each of the ink supply device 10K and the like supplies ink of the corresponding color to each of the ink jet bar 14K and the like.

Each of the ink supply device 10K, the ink supply device 10C, the ink supply device 10M, the ink supply device 10Y, and the ink supply device 10W shown in FIG. 21 corresponds to the ink supply device 10 shown in FIG. 1.

In the following description, the ink jet bar 14K, the ink jet bar 14C, the ink jet bar 14M, the ink jet bar 14Y, and the ink jet bar 14W may be collectively referred to as the ink jet bar 14. Similarly, the ink supply device 10K, the ink supply device 10C, the ink supply device 10M, the ink supply device 10Y, and the ink supply device 10W may be collectively referred to as the ink supply device 10. The ink jet bar 14K and the like described in the embodiment are an example of a printing head.

Aqueous ink such as black or cyanide is dropped on the paper 1, which is supported and conveyed using the printing drum 152, directly below the ink jet bar 14, and a color image is printed.

The aqueous ink includes an ink in which pigment particles are dispersed in a solvent such as water. In the white ink, titanium oxide is applied as a material of pigment particles capable of being sedimented in a solvent. A value more than 100 nanometers can be applied to an average particle diameter of the titanium oxide particles contained in the white ink. As the average particle diameter, a particle diameter having an integrated value of 50% in particle size distribution derived by using a laser diffraction scattering method can be applied.

A density of the pigment particles in the white ink may be 2.0 grams per cubic centimeter or greater. The density of the pigment particles in the white ink may be 5.0 grams per cubic centimeter or greater.

The printing device 150 comprises a scanner 156. The scanner 156 comprises an imaging device that captures an image such as a test image printed on a printing surface of the paper 1 and generates an imaging signal corresponding to the image. As the imaging device, a color CCD linear image sensor can be applied. As the imaging device, a color CMOS linear image sensor may be applied.

The illustration of the imaging device is omitted. CCD is an abbreviation for charge coupled device. CMOS is an abbreviation for complementary metal oxide semiconductor. The paper 1 on which the color image is printed using the printing device 150 is conveyed to the drying device 170.

[Drying Device]

In the drying device 170, hot air is blown toward the printing surface of the paper 1 supported by a drying drum 172 to dry the printing surface of the paper 1. The paper 1 that has been subjected to the drying treatment on the printing surface using the drying device 170 is conveyed to the winding device 180.

[Configuration of Ink Jet Bar and Head Module]

As the ink jet bar 14, a structure in which the plurality of head modules 15 are connected can be applied in a width direction of the paper 1. The same structure can be applied to the plurality of head modules 15. The width direction of the paper 1 is a direction orthogonal to the paper conveyance direction. Hereinafter, the width direction of the paper 1 may be referred to as a paper width direction.

Figure 22:
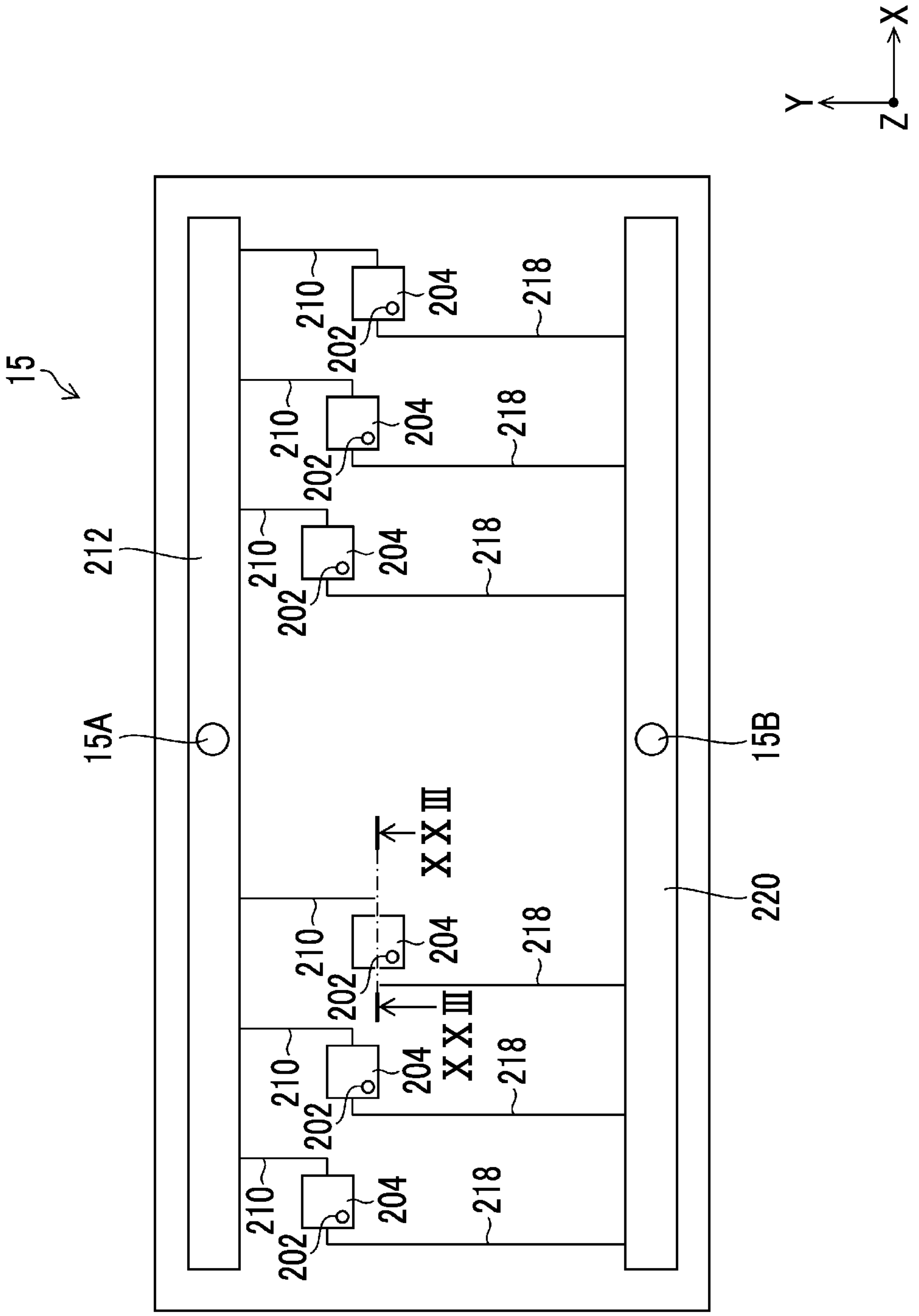
FIG. 22 is a perspective plan view showing a structural example of a head module.

FIG. 22 is a perspective plan view showing a structural example of the head module. FIG. 22 is a schematic diagram showing a flow passage structure of the head module 15.

Reference numeral X in FIG. 22 indicates the paper width direction. Reference numeral Y represents the paper conveyance direction. Reference numeral Z is a normal direction of an outer peripheral surface of the printing drum 152, and is a direction parallel to a direction in which a nozzle surface of the ink jet bar 14 is directed.

The head module 15 comprises a plurality of nozzles 202. The plurality of nozzles 202 are arranged in a two-dimensional manner. FIG. 22 shows an example in which matrix arrangement is applied as the arrangement of the plurality of nozzles 202.

Each of the plurality of nozzles 202 communicates with a pressure chamber 204. The pressure chamber 204 communicates with a supply tributary 210. The supply tributary 210 communicates with a common flow passage 212. The common flow passage 212 communicates with the ink supply port 15A.

In addition, each nozzle 202 communicates with a recovery tributary 218 via an ink circulation path. The recovery tributary 218 communicates with a circulation common flow passage 220. The circulation common flow passage 220 communicates with the ink discharge port 15B. In FIG. 22, the ink circulation path is not shown. The ink circulation path is illustrated with reference numeral 216 in FIG. 23. In FIG. 22, a circle is illustrated as an opening shape of the nozzle 202, but a shape other than the circle, such as a quadrangle, can be applied to the opening shape of the nozzle 202.

Figure 23:
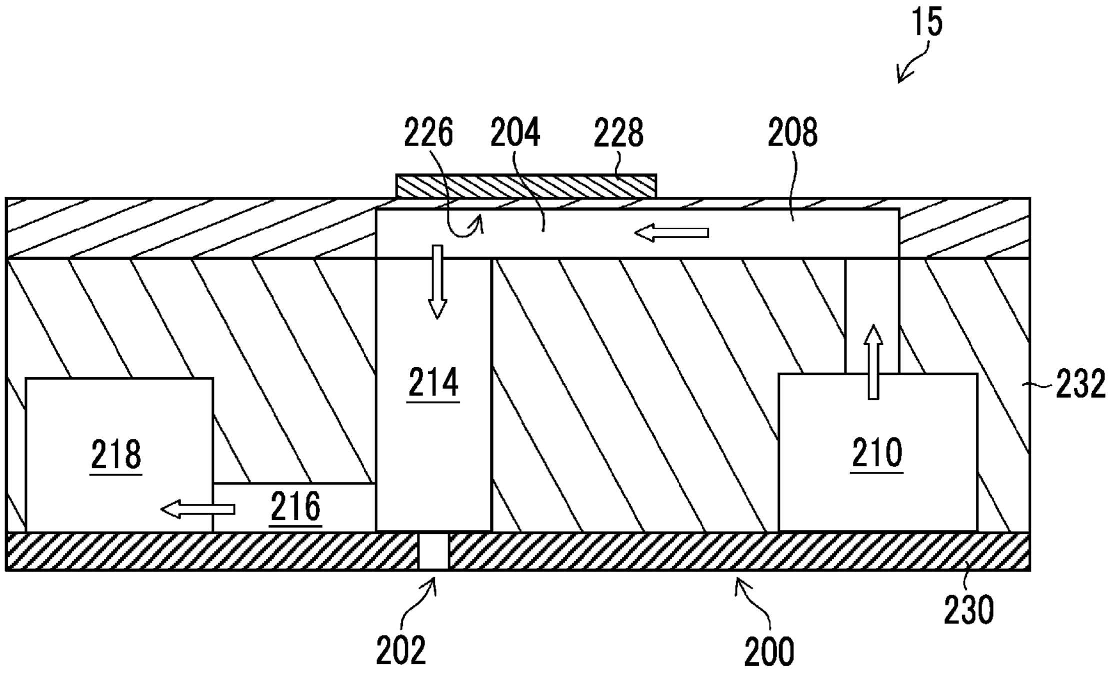
FIG. 23 is a cross-sectional view taken along a cross-sectional line of XXIII-XXIII shown in FIG. 22.

FIG. 23 is a cross-sectional view taken along a cross-sectional line of XXIII-XXIII shown in FIG. 22. FIG. 23 illustrates a three-dimensional structure of the head module 15. The head module 15 comprises a nozzle plate 230, a flow passage plate 232, and an actuator 228. The head module 15 has a structure in which the nozzle plate 230, the flow passage plate 232, and the actuator 228 are laminated in this order.

The plurality of nozzles 202 are formed on the nozzle plate 230. The nozzle 202 has an opening formed in a nozzle surface 200 and has a structure that penetrates the nozzle plate 230.

The flow passage plate 232 is formed with a pressure chamber 204, a supply throttle 208, a supply tributary 210, a common flow passage 212, a descender 214, an ink circulation path 216, a recovery tributary 218, and a circulation common flow passage 220. In FIG. 23, the common flow passage 212 and the circulation common flow passage 220 are not shown.

Silicon can be applied as a material for the nozzle plate 230 and the flow passage plate 232. For the nozzle plate 230 and the flow passage plate 232, a semiconductor manufacturing process can be applied as a processing method to process structures of the nozzle 202 and the pressure chamber 204, and the like.

The nozzle 202 communicates with the pressure chamber 204 via the descender 214. The pressure chamber 204 communicates with the supply tributary 210 via the supply throttle 208. In addition, the nozzle 202 communicates with the recovery tributary 218 via the ink circulation path 216.

The ink supplied to the ink supply port 15A shown in FIG. 22 flows through the common flow passage 212, the supply tributary 210, the supply throttle 208, the pressure chamber 204, and the descender 214, and a part of the ink is jetted from each nozzle 202. The ink that is not jetted from the nozzle 202 is discharged from the ink discharge port 15B via the ink circulation path 216, the recovery tributary 218, and the circulation common flow passage 220.

It is preferable that the ink circulation path 216 is disposed around the nozzle 202. In the head module 15 shown in FIG. 23, the ink circulation path 216 is disposed in a region that communicates with the descender 214 and is in contact with the nozzle plate 230 of the flow passage plate 232. As a result, the ink can be circulated in the vicinity of the nozzle 202, the thickening of the ink in the inside of the nozzle 202 can be suppressed, and stable jetting of the head module 15 can be realized.

The actuator 228 is bonded to a vibration plate 226 which is a top surface of the pressure chamber 204 and is also used as a common electrode. A piezoelectric element comprising a piezoelectric layer and individual electrodes is applied to the actuator 228. The piezoelectric layer and the individual electrodes are not shown.

The actuator 228 bends and deforms in accordance with an application of a driving voltage to the individual electrodes, thereby deforming the pressure chamber 204. The ink is jetted from the nozzle 202 in accordance with the contraction of the pressure chamber 204. In accordance with the expansion of the pressure chamber 204 after the ink is jetted from the nozzle 202, new ink is supplied from the common flow passage 212 to the pressure chamber 204 through the supply tributary 210 and the supply throttle 208.

In the present embodiment, a piezoelectric method is exemplified as a jetting method of the ink, but a thermal method, an electrostatic method, or the like may be applied as the jetting method of the ink. In addition, the arrangement of the nozzles 202 is not limited to the matrix arrangement, and a one-row arrangement, a two-row zigzag arrangement, or the like can be applied.

[Electric Configuration of Ink Jet Printing System]

Figure 24:
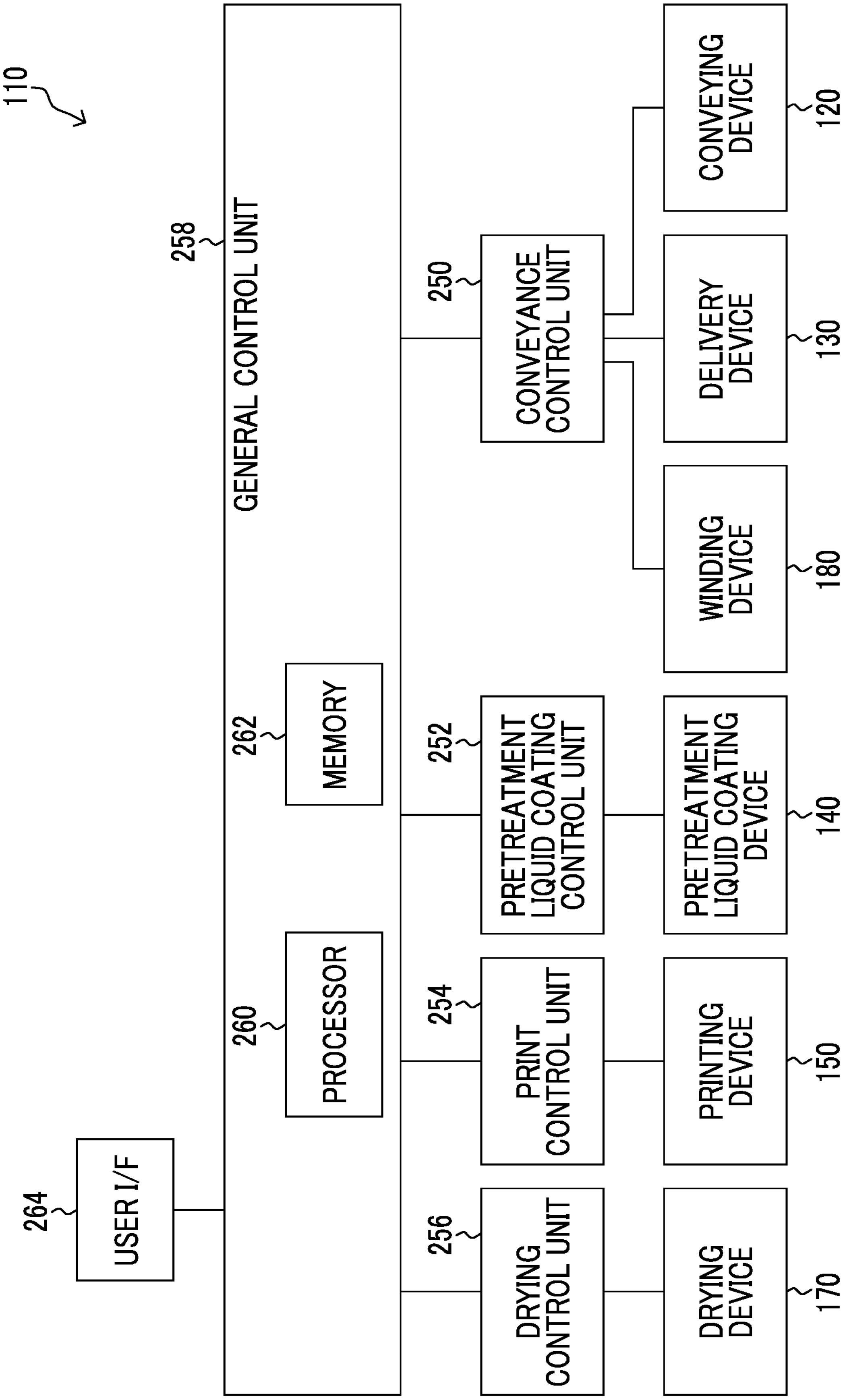
FIG. 24 is a functional block diagram showing an electric configuration of the ink jet printing system shown in FIG. 21.

FIG. 24 is a functional block diagram showing an electric configuration of the ink jet printing system shown in FIG. 21. The ink jet printing system 110 comprises a conveyance control unit 250, a pretreatment liquid coating control unit 252, a print control unit 254, a drying control unit 256, a general control unit 258, and a user interface 264.

The conveyance control unit 250 controls the operations of the conveying device 120, the delivery device 130, and the winding device 180 based on predetermined conveyance conditions, and controls the conveyance of the paper 1 from the delivery device 130 to the winding device 180.

Examples of the conveyance conditions include a conveyance speed of the paper 1, a suction pressure in a case in which the paper 1 is supported by suction, and a conveyance tension applied to the paper 1. The term "speed" may include the meaning of speed, which is an absolute value.

That is, the conveyance control unit 250 controls the rotation of the motor connected to the conveyance member such as the printing drum 152 to control the conveyance speed of the paper 1.

In addition, the operation of the pump connected to each of suction holes formed on the outer peripheral surface of the printing drum 152 and suction holes formed on an outer peripheral surface of the drying drum 172 is controlled to control the suction pressure of the paper 1 on the outer peripheral surface of the printing drum 152 and the suction pressure of the paper 1 on the outer peripheral surface of the drying drum 172.

Further, the conveyance control unit 250 controls an operation of a conveyance tension applying mechanism that applies the conveyance tension to the paper 1 in each device to control the conveyance tension applied to the paper 1.

The pretreatment liquid coating control unit 252 applies predetermined application conditions and controls the operation of the pretreatment liquid coating device 140 to control the coating of the paper 1 with the pretreatment liquid. That is, the pretreatment liquid coating control unit 252 controls an application timing of the pretreatment liquid to the paper 1 and an application amount of the pretreatment liquid to be applied to the paper 1.

The pretreatment liquid coating control unit 252 applies predetermined drying conditions and controls the operation of the pretreatment liquid drying device 146 to control the drying treatment of the paper 1 coated with the pretreatment liquid. That is, the pretreatment liquid coating control unit 252 performs temperature control of the drying treatment and controls an execution timing of the drying treatment.

The print control unit 254 integrally controls the operation of the ink supply device 10 shown in FIG. 21. The print control unit 254 comprises the general control unit 94, the valve control unit 97, and the pump control unit 98 shown in FIG. 2, and controls ink supply and ink circulation to the ink jet bar 14.

The print control unit 254 controls jetting of the ink in the ink jet bar 14 by applying predetermined print conditions and print data. The print control unit 254 comprises an image processing unit that generates halftone data for each color from print data such as raster data.

The print control unit 254 comprises a driving voltage generation unit that generates a driving voltage to be supplied to the ink jet bar 14 based on halftone data for each color. The print control unit 254 comprises a driving voltage output unit that outputs a driving voltage supplied to the ink jet bar 14.

The print control unit 254 executes correction processing of the ink jet bar 14 based on an imaging signal corresponding to a test image or the like transmitted from the scanner 156 shown in FIG. 21. Examples of the correction processing include density correction, color correction, and correction processing for an abnormal nozzle.

The print control unit 254 comprises a maintenance control unit that controls maintenance of the ink jet bar 14. Examples of the maintenance of the ink jet bar 14 include wiping the nozzle surface 200, purging to discharge ink from the nozzle 202, and moisturizing the nozzle surface 200.

The drying control unit 256 applies predetermined drying conditions and controls the operation of the drying device 170 to control the drying treatment on the paper 1 on which the image is printed. That is, the drying control unit 256 controls a temperature and an air volume of hot air blown onto the paper 1.

The general control unit 258 transmits a command signal to the conveyance control unit 250, the pretreatment liquid coating control unit 252, the print control unit 254, and the drying control unit 256, and integrally controls the operation of the ink jet printing system 110.

The general control unit 258 comprises one or more processors 260 and one or more memories 262. The general control unit 258 of the ink jet printing system 110 shown in FIG. 24 includes the general control unit 94 of the ink supply device 10 shown in FIG. 2. In addition, the processor 260 shown in FIG. 24 includes the processor 95 shown in FIG. 2. In addition, the memory 262 shown in FIG. 24 includes the memory 96 shown in FIG. 2.

The user interface 264 is used in a case in which a user operates the ink jet printing system 110. The user interface 264 may include an input device such as a keyboard and a mouse. The user interface 264 may include a display device that displays various types of information in the ink jet printing system 110. A touch panel type display device may be applied to integrally configure the display device and the input device.

[Modification Example of Ink Jet Printing System]

The ink jet printing system 110 may execute processing to change a surface property such as a surface roughness of the paper 1 by applying a reforming treatment on the paper 1 before the pretreatment liquid. As the reforming treatment, a corona discharge treatment can be applied.

The ink jet printing system 110 can apply a one-liquid method for executing printing on the paper 1 without using the pretreatment liquid. The ink jet printing system 110 to which the one-liquid method is applied is not provided with the pretreatment liquid coating device 140.

The ink jet printing system 110 may add various functions applied to various ink jet printing devices. Examples of the various functions include inspection processing for determining the quality of the printed paper 1.

[Example of Application to Program]

A program may be configured to cause a computer to realize various functions in ink circulation applied to the ink supply device 10. That is, a program may be configured to cause a computer to realize a non-printing period determination function, an ink circulation determination function, a liquid level height adjusting function, a valve switching function, a pump selection function, and the like.

It is possible to store a program causing a computer to realize the various functions described above, in a computer-readable information storage medium, which is a tangible non-temporary information storage medium, and to provide the program through the information storage medium.

In addition, an aspect in which a program is provided by being stored in a non-temporary information storage medium can be applied. Instead of such an aspect, an aspect in which a signal corresponding to the program is provided via a communication network can also be realized.

In the embodiment of the present invention described above, the configuration requirements can be changed, added, or deleted as appropriate without departing from the spirit of the present invention. The present invention is not limited to the embodiment described above, and many modifications can be made by a person having ordinary knowledge in the art within the technical idea of the present invention. In addition, the embodiment, modification example, and application example may be combined as appropriate.

EXPLANATION OF REFERENCES

1: paper
10: ink supply device
10C: ink supply device
10K: ink supply device
10M: ink supply device
10W: ink supply device
10Y: ink supply device
12: buffer tank
12A: supply port
12B: recovery port
12C: bypass port
12D: overflow port
12E: upper end position
12F: center
13A: side surface
13B: upper surface
13C: inner side surface
13D: bottom surface
13E: end
14: ink jet bar
14C: ink jet bar

14K: ink jet bar
14M: ink jet bar
14W: ink jet bar
14Y: ink jet bar
15: head module
15A: ink supply port
15B: ink discharge port
16: supply flow passage
18: recovery flow passage
22: deaeration module
24: supply pump
26: supply-side filter
28: heat exchanger
30: supply-side back pressure tank
30A: ink inlet
30B: ink outlet
30C: liquid chamber
30D: air chamber
30E: elastic film
30F: air bubble discharge port
30G: air flow passage communication port
32: supply-side head manifold
34: supply-side pressure sensor
35: ink supply flow passage
36: supply valve
38: supply damper
40: recovery damper
42: recovery valve
44: recovery-side head manifold
46: recovery-side pressure sensor
47: drain flow passage
48: recovery-side back pressure tank
48A: ink inlet
48B: ink outlet
48C: liquid chamber
48D: air chamber
48E: elastic film
48F: air bubble discharge port
48G: air flow passage communication port
49: drain flow passage
50: recovery pump
52: recovery flow passage valve
54: bypass flow passage
56: drain valve
58: air flow passage
59: air connect valve
60: air tank
61: atmospheric communication path
62: air valve
64: first bypass flow passage
66: second bypass flow passage
68: first bypass flow passage valve
69: second bypass flow passage valve
70: drain valve
71: air flow passage
72: air connect valve
73: air tank
74: atmospheric communication path
75: air valve
76: ink main tank
76A: main tank filter
78: replenishment flow passage
80: overflow passage
82: replenishment pump
84: first safety valve
86: second safety valve
88: third safety valve
90: recovery-side filter
92: recovery-side filter valve
94: general control unit
95: processor
96: memory
97: valve control unit
97A: valve
98: pump control unit
98A: pump
99: sensor
99A: liquid level detection sensor
99B: wiring line
110: ink jet printing system
120: conveying device
122: pass roller
130: delivery device
132: feeding roll
140: pretreatment liquid coating device
142: coating roller
144: facing roller
146: pretreatment liquid drying device
150: printing device
152: printing drum
156: scanner
170: drying device
172: drying drum
180: winding device
182: winding roll
200: nozzle surface
202: nozzle
204: pressure chamber
210: supply tributary
212: common flow passage
214: descender
216: ink circulation path
218: recovery tributary
220: circulation common flow passage
226: vibration plate
228: actuator
230: nozzle plate
232: flow passage plate
250: conveyance control unit
252: pretreatment liquid coating control unit
254: print control unit
256: drying control unit
258: general control unit
260: processor
262: memory
264: user interface
300: ink
302: liquid level height
306: downward ink flow
308: upward ink flow
312: buffer tank
312B: recovery port
314: inner side surface
316: downward surface
322: ink
324: bottom surface
400: ink supply device
412: buffer tank
412A: supply port
412C: bypass port
414: ink jet bar
415: head module
416: supply flow passage
422: deaeration module

424: supply pump
426: supply-side filter
428: heat exchanger
430: supply-side back pressure tank
432: supply-side head manifold
434: supply-side pressure sensor
435: ink supply flow passage
436: supply valve
438: supply damper
447: drain flow passage
454: bypass flow passage
456: drain valve
476: ink main tank
478: replenishment flow passage
480: overflow passage
482: replenishment pump
484: first safety valve
486: second safety valve
F: joint
$F_1$: joint
$F_2$: joint
$F_3$: joint
$F_{11}$: joint
$F_{12}$: joint
$F_{13}$: joint
$F_{14}$: joint
S10 to S26: each step of ink circulation method

What is claimed is:

1. A liquid supply system comprising:
a buffer tank in which a liquid to be supplied to a liquid supply target device is stored and that is provided with a liquid inlet and outlet through which the liquid enters and exits;
a main tank, configured to supply the liquid to the buffer tank;
a liquid level varying device that changes a liquid level height in the buffer tank;
a liquid flow passage through which the liquid supply target device and the buffer tank communicate with each other;
a pump provided in the liquid flow passage;
a valve for opening and closing the liquid flow passage; and
one or more processors,
wherein the processor is configured to:
in a case in which the liquid supply target device is not in operation, control the liquid level varying device such that the liquid is discharged from the buffer tank to the main tank to lower the liquid level height in the buffer tank with respect to the liquid level height in the buffer tank in a case in which the liquid supply target device is in operation; and
in a case in which the liquid supply target device is not in operation, control the pump and the valve to allow the liquid to flow into the buffer tank from the liquid flow passage.

2. The liquid supply system according to claim 1,
wherein, as the liquid, a liquid in which particles capable of being sedimented in a solvent are dispersed in the solvent is applied.

3. The liquid supply system according to claim 2,
wherein, in the liquid, a density of the particles is 2.0 grams per cubic centimeter or greater.

4. The liquid supply system according to claim 1,
wherein the buffer tank includes a supply port and a recovery port as the liquid inlet and outlet,
the liquid flow passage includes
a supply flow passage communicating with the supply port, and
a recovery flow passage communicating with the recovery port and the supply flow passage, and
the pump includes
a supply pump provided in the supply flow passage, and
a recovery pump provided in the recovery flow passage.

5. The liquid supply system according to claim 4,
wherein the processor is configured to control any one of the supply pump or the recovery pump to execute reverse circulation in which the liquid flows in a direction different from normal circulation in which the liquid flows out via the supply port and the liquid flows into the buffer tank via the liquid inlet and outlet different from the supply port.

6. The liquid supply system according to claim 5,
wherein the liquid flow passage includes a bypass flow passage that communicates with the buffer tank and the supply flow passage and is a separate flow passage from the recovery flow passage,
the buffer tank includes a bypass port communicating with the bypass flow passage, as the liquid inlet and outlet, and
the processor is configured to execute the reverse circulation in which the supply pump is reversely operated with respect to the normal circulation, and the liquid flows in the bypass flow passage and the supply flow passage in a direction different from the normal circulation.

7. The liquid supply system according to claim 5, further comprising:
a filter provided in the supply flow passage,
wherein the processor is configured to control any one of the supply pump or the recovery pump to execute the normal circulation in which the liquid that has not passed through the filter returns to the buffer tank, after the reverse circulation is executed.

8. The liquid supply system according to claim 5,
wherein the liquid level varying device includes the supply flow passage and the supply pump, and
the processor is configured to control the supply pump to feed the liquid from the buffer tank to the liquid supply target device via the supply port and the supply flow passage.

9. The liquid supply system according to claim 1,
wherein the liquid level varying device includes
a replenishment flow passage communicating with the liquid inlet and outlet,
a replenishment pump provided in the replenishment flow passage, and
a main tank communicating with the replenishment flow passage, and
the processor is configured to control the replenishment pump to feed the liquid from the buffer tank to the main tank via the liquid inlet and outlet and the replenishment flow passage.

10. The liquid supply system according to claim 1,
wherein the processor is configured to control the pump to increase a flow rate of the liquid with respect to a flow rate of the liquid in a case in which the liquid supply target device is in operation, in a range where a performance of the pump is acceptable.

11. The liquid supply system according to claim 1,
wherein the processor is configured to set non-supply of the liquid to the liquid supply target device in a case in which liquid circulation is executed in a case in which the liquid supply target device is not in operation.

12. The liquid supply system according to claim 1, wherein the buffer tank includes a bottom surface having a structure in which stagnation of a liquid flow is suppressed.

13. The liquid supply system according to claim 1, wherein the buffer tank includes a bottom surface that is subjected to a coating treatment in which a fluorine resin is applied as a coating material.

14. The liquid supply system according to claim 1, wherein the buffer tank is configured such that a distance from a side surface intersecting a surface on which the liquid inlet and outlet is disposed to a center of the liquid inlet and outlet is equal to or more than half of an inner diameter of the liquid inlet and outlet, and is equal to or less than three times the inner diameter of the liquid inlet and outlet.

15. A liquid circulation method that is applied to a liquid supply device that supplies a liquid from a buffer tank to a liquid supply target device through a liquid flow passage, the method comprising:

discharging the liquid from the buffer tank to a main tank to lower a liquid level height in the buffer tank with respect to a liquid level height in the buffer tank in a case in which the liquid supply target device is in operation, in a case in which the liquid supply target device is not in operation, wherein the main tank is configured to supply the liquid to the buffer tank; and controlling a pump and a valve provided in the liquid flow passage to allow the liquid to flow into the buffer tank from the liquid flow passage, in a case in which the liquid supply target device is not in operation.

16. A printing system comprising:

a buffer tank in which ink to be supplied to a printing head is stored and that is provided with a liquid inlet and outlet through which the ink enters and exits;

a main tank, configured to supply the ink to the buffer tank;

a liquid level varying device that changes a liquid level height in the buffer tank;

a liquid flow passage through which the printing head and the buffer tank communicate with each other;

a pump provided in the liquid flow passage;

a valve for opening and closing the liquid flow passage; and one or more processors, wherein the processor is configured to:

in a case in which the printing head is not in operation, control the liquid level varying device such that the ink is discharged from the buffer tank to the main tank to lower the liquid level height in the buffer tank with respect to the liquid level height in the buffer tank in a case in which the printing head is in operation; and in a case in which the printing head is not in operation, control the pump and the valve to allow the ink to flow into the buffer tank from the liquid flow passage.

* * * * *